United States Patent [19]

Anderson et al.

[11] Patent Number: 5,623,562

[45] Date of Patent: Apr. 22, 1997

[54] METHOD OF ALIGNING OPPOSING OPTICAL TRANSMISSION PATHS IN A MECHANICAL OPTICAL SWITCH

[75] Inventors: Duwayne R. Anderson; Steve U. Reinhold, both of Redmond; Lorimer L. Twigg, Sisters; Mark D. Marineau, Redmond, all of Oreg.

[73] Assignee: Tektronix, Inc., Wilsonville, Oreg.

[21] Appl. No.: 478,174

[22] Filed: Jun. 7, 1995

Related U.S. Application Data

[63] Continuation-in-part of Ser. No. 393,583, Feb. 23, 1995, abandoned, which is a continuation-in-part of Ser. No. 223,298, Apr. 5, 1994, Pat. No. 5,438,638.

[51] Int. Cl.$^6$ ........................................... G02B 6/40
[52] U.S. Cl. .................. 385/16; 385/20; 385/23; 385/22; 385/65; 385/67
[58] Field of Search ............................ 385/15–23, 25, 385/26, 65, 67, 147

[56] References Cited

U.S. PATENT DOCUMENTS

| | | | |
|---|---|---|---|
| 3,800,388 | 4/1974 | Borner et al. | 29/200 |
| 4,239,333 | 12/1980 | Dakss et al. | 350/96.21 |
| 4,401,365 | 8/1983 | Mizokawa et al. | 350/96.2 |
| 4,834,488 | 5/1989 | Lee | 385/20 |
| 4,896,935 | 1/1990 | Lee | 350/96.2 |
| 4,953,932 | 9/1990 | Mihich | 350/96.15 |
| 4,955,976 | 9/1990 | Freeman et al. | 350/96.21 |
| 5,031,994 | 7/1991 | Emmons | 350/96.2 |
| 5,037,176 | 8/1991 | Roberts et al. | 385/16 |
| 5,359,683 | 10/1994 | Pan | 385/22 |

*Primary Examiner*—John Ngo
*Attorney, Agent, or Firm*—William K. Bucher

[57] ABSTRACT

A mechanical optical switch having opposing first and second optical transmission paths, such as optical fibers, forming an optical interface and rotating about respective independent and offset first and second rotational axes for positioning the fibers on respective first and second offset and intersecting closed curves operates to rotate the input or first optical fiber on its closed curve to one of the two intersecting points on its closed curve in response to the angular coordinate representative of the position of fiber at the intersecting point matching the intersecting point of the second optical fiber. The output or second optical fiber is rotated on its closed curve to the intersecting point corresponding to the intersecting point of the first fiber in response to the angular coordinate representative of the position of the second fiber at the intersecting point. These rotational movements may be performed sequentially, but in the preferred embodiment they are performed simultaneously. Since the offset closed curves intersect at two unique points, the speed of the switch may be increased by selecting the intersecting points closest to the input and output fibers prior to rotating the fibers. A plurality of optical fibers can rotate about one or both of the independent and offset rotational axes for establishing intersecting points on their respective closed curves.

27 Claims, 20 Drawing Sheets

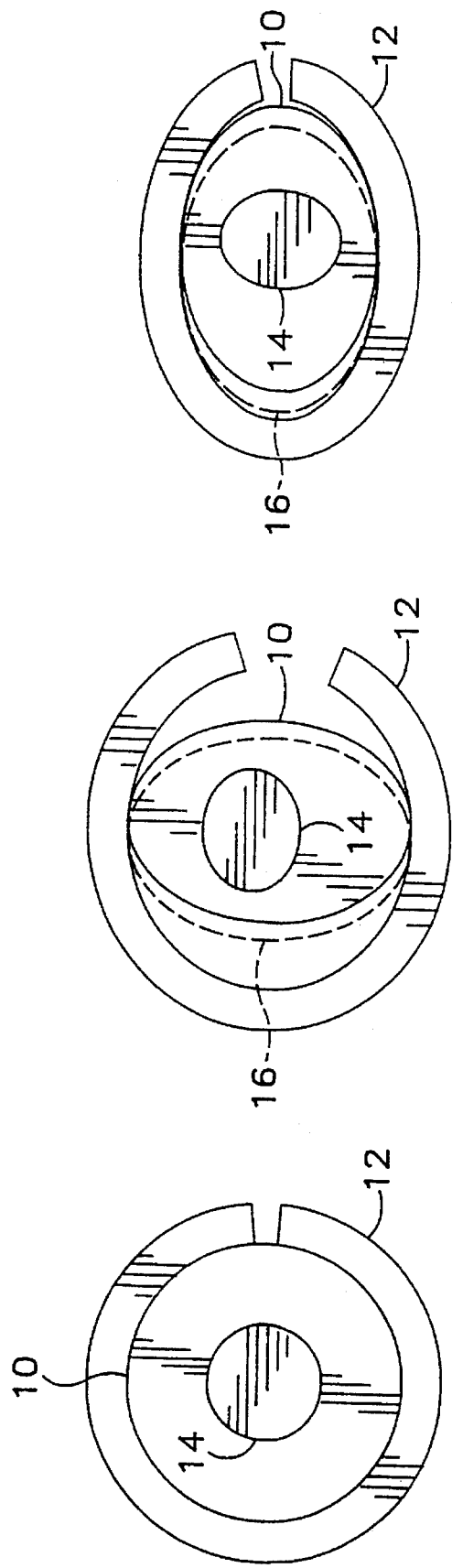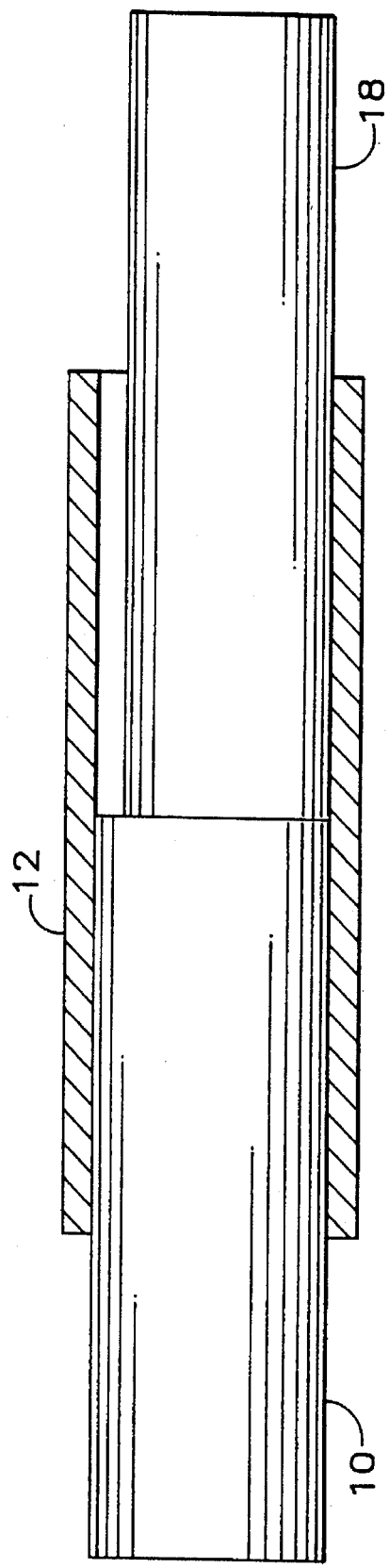

METHOD OF ALIGNING OPPOSING OPTICAL TRANSMISSION PATHS IN A MECHANICAL OPTICAL SWITCH

This is a continuation-in-part application of application Ser. No. 08/393,583, filed Feb. 23, 1995 now abandoned, which is a continuation-in-part application of application Ser. No. 08/223,298, filed Apr. 5, 1994 now U.S. Pat. No. 5,438,638.

BACKGROUND OF THE INVENTION

The present invention relates generally to optical switches and more specifically to a mechanical optical switch for rotatably coupling an optical fiber of a first optical fiber array with a second optical fiber of an opposing optical fiber array.

There are generally two types of optical switches in use today: electronic optical switches and mechanical optical switches. Electronic optical switches may be characterized as having no moving parts and perform the switching function, for example, by acousto-optically or electro-optically diverting the light passing through the switch.

Mechanical optical switches, on the other hand, physically move optical fiber elements to produce the switching function. Generally the physical movement of the optical fibers in mechanical optical switches is either transversal or rotational. One family of mechanical optical switches uses focusing elements, such as lenses or the like, to focus the light from one fiber to another. The use of such elements increases the translational tolerances of the switch but substantially decreases its angular tolerances and increases its cost. The other family of mechanical optical switches directly couple the light from one optical fiber to the other. The optical fibers are positioned in opposing relationship with the end faces of the optical fibers in substantially abutting relationship with each other. While this design eliminates the focusing elements and increases the angular tolerances, it substantially decreases the translational tolerance of the switch.

U.S. Pat. No. 4,401,365 describes a rotary-type optical switch in which a pair of opposing optical transmission path mounting members are disposed on the same rotational axis. One mounting member may be fixedly secured in a casing while the other member rotates on a central shaft. Alternately, the shaft may be fixed with one of the mounting members rotating about the shaft. The shaft or the mounting member is directly connected to a motor so that one mounting member is rotatable with respect to the other as the shaft or mounting member is rotated by the motor. The mounting members have respective plane surfaces which are closely opposite each other. Optical fibers are secured in each mounting member such that the end faces of the optical fibers in each mounting member are concentric about the rotational axis of the mounting member and lie on respective phantom circles having the same radii.

U.S. Pat. No. 5,037,176 describes another rotary-type optical switch that includes first and second identical arrays of optical fibers held in axial alignment and relatively rotatable about an axis of rotation to effect optical coupling and decoupling of fibers in the opposing arrays. The optical switch has cylindrical switch bodies that receive the first and second identical arrays of optical fibers. The switch bodies are maintained in coaxial alignment by means of a split sleeve coupler. A tube surrounds the sleeve containing the fiber arrays and O-rings may be disposed between the sleeve and the tube to permit an index matching fluid to be retained within the switch to prevent back reflections. The optical switch described in the '176 patent is incorporated into an optical switch assembly described in U.S. Pat. No. 5,031,994.

A critical factor in mechanical fiber optical switches (MFOS) is the precise alignment of the opposing optical fibers in the switch. Currently, this requires the components of the switch to be made to very precise tolerances along with exacting manufacturing processes. As will be described below, current MFOS fall short in cycle-to-cycle repeatability, long-term repeatability and absolute alignment of the opposing optical fibers.

Mechanical fiber optic switches have unique bearing requirements that are not found in other types of applications. These special requirements need to be examined to understand why current MFOS do not provide the optimum alignment between switching fibers. The alignment tolerances for light coupling between single-mode optical fibers is well known and need not be discussed in detail here. Assuming no longitudinal or tilt misalignment and the input and output fibers are identical, the fractional coupling transmission for optical fibers with lateral misalignment is $$T = \exp\left\{ -\frac{x^2}{w^2} \right\} \quad [1]$$

where x is the lateral offset and w is the $1/e^2$ radius of the irradiance pattern of the fundamental mode of the optical fiber. The derivative of equation [1] is taken to obtain the change in loss for a given change in coupling efficiency.

$$\Delta T = -\frac{2x}{w^2} \cdot \Delta x \cdot \exp\left\{ -\frac{x^2}{w^2} \right\} \quad [2]$$

Equation [2] can be rearranged to solve for $\Delta x$ as a function of the lateral offset, radius of the fundamental fiber mode, and the change in loss. The result is $$\Delta x = -\frac{w^2}{2x} \cdot \Delta T \cdot \exp\left\{ \frac{-x^2}{w^2} \right\} \quad [3]$$

Using the above equations and assuming a transmission efficiency of the switch must be repeatable within 0.01 dB on a cycle-to-cycle basis with a nominal transmission loss of less than 0.50 dB, maximum alignment tolerance values can be calculated for cycle-to-cycle repeatability, long-term repeatability, and absolute alignment. Since the $1/e^2$ radius of the fundamental mode in standard single-mode fiber is roughly 5.0 microns, the nominal loss of 0.50 dB corresponds to a lateral misalignment of approximately 1.7 microns (according to equation [1]). According to equation [3], if the transmission changes less than 0.01 dB on a cycle-to-cycle basis, the misalignment of 1.7 microns must be repeated to within 0.015 microns, or 15 nanometers. The numerical tolerance are calculated for an optical fiber having a mode field diameter of 5.0 microns. Other optical fiber may, for example, have mode filed diameters, such as 5.1 or 5.6 microns. Different mode field diameters will change the numerical tolerances slightly but not substantially.

The 0.015 micron requirement is for cycle-to-cycle repeatability only. There is also a long term repeatability requirement where the transmission efficiency must not change by more than 0.10 dB over about 100,000 cycles. Applying the same analysis using equations [1] and [3], the position accuracy of the opposing fibers in the switch must repeat to within 0.15 microns on a long-term basis or about ¼th of a wavelength of visible light.

Referring now to FIG. 1A, there is shown an end view of a cylindrical shaft 10 inside a split sleeve 12. In an ideal world, the shaft 10 is perfectly round and has exactly the same outside diameter as the equally perfectly round inside diameter of the split sleeve 12 with the shaft 10 touching the split sleeve 12 along its entire circumference. A bore 14 formed in the shaft 10 for holding the optical fibers is perfectly round and concentric with the shaft 10 and split sleeve 12. FIGS. 1B and 1C illustrate on an exaggerated scale the type of shaft 10, split sleeve 12, and bore 14 that can be expected in the real, imperfect world. None of the elements 10, 12, or 14 will be perfectly round. Instead, shaft 10 and split sleeve 12 will approximate a cylindrical surface, with local regions where the radius is slightly too large, or too small. This is shown in the figures as an ellipse. As can be seen from the figures, the points of contact between the split sleeve 12 and the shaft 10 will change as one or the other rotates, or if any slight lateral torque, as shown by dashed ellipse 16, is applied to the shaft 10, so that fibers (not shown) in the shaft will not trace out concentric circles. Notice also that, at the point of contact, the surface of the split sleeve 12 is parallel to the surface of the shaft 10. The only force preventing the shaft 10 from slipping in the split sleeve 12 is the frictional force between the two surfaces. The frictional force is incapable of reliably providing the kind of cycle-to-cycle or long-term repeatability that is needed. Furthermore, there is the paradox of lubrication. In order to extend the life of the bearing surfaces it is desirable to lubricate them, but lubrication reduces the frictional forces between the two surfaces, resulting in more wobble.

FIGS. 1B and 1C illustrate an additional problem. The fibers align themselves to the shaft 10 via the bore 14 drilled along the axis of the shaft 10, and this bore 14 has its own set of tolerances. Specifically, the bore 14 will be slightly out of concentricity with the outside surface of the shaft 10, and like the outside surface of the shaft 10, it will be slightly out-of-round.

There are multiple dimensional tolerances that must be tightly specified if the input and output fibers of the switch are to rotate on identical circles that are precisely concentric. The design parameters that must be firmly controlled are:

Roundness of the input shaft outside diameter.
Roundness of the output shaft outside diameter.
Roundness of the input shaft inside diameter.
Roundness of the output shaft inside diameter.
Concentricity of the input shaft inside and outside diameters.
Concentricity of the output shaft inside and outside diameters.
Outside diameter of the input shaft.
Inside diameter of the input shaft.
Outside diameter of the output shaft.
Inside diameter of the output shaft.
Inside diameter of the split sleeve.
Roundness of the split sleeve inside diameter.
Diameters of the input and output fibers.
Concentricity of the input and output fibers.

To maintain an insertion loss of less than 0.50 dB, all of these tolerances must add up to less than about 0.17 microns of misalignment. This is an extremely difficult task, and to accomplish it the individual components (input fibers, output fibers, input shaft, output shaft, and split sleeve) must have several dimensional tolerances that are sub-micron. This is certainly not conducive for minimizing the costs of individual components, and is daunting in terms of manufacturability.

Another issue in mechanical fiber optic switch design is switch repeatability. Referring to FIG. 2, there is shown a side view of the shaft 10 and sleeve 12 of FIGS. 1B and 1C with the sleeve 12 being sectioned. The split sleeve 12 works with shaft 10 that is slightly larger than the inside diameter of the unexpanded sleeve 12. Because the sleeve 12 is split, it can expand slightly to allow the shaft 10 (a ferrule containing the optical fibers) to fit inside with no diametrical clearance. Diametrical clearance is unsatisfactory because it results in slop within the bearing, and there is needed less than 0.015 microns of misalignment non-repeatability between the opposing fibers to meet the cycle-to-cycle repeatability specifications.

As has been discussed with FIGS. 1B and 1C, the out of roundness on the part of the shaft 10 and the sleeve 12 will cause the fiber to move on curves that are not circles. However, barring wear in the bearing, out-of-roundness should not result in slop or lack of repeatability. Out-of-roundness will affect the total coupling efficiency, but not the repeatability. FIG. 2 shows the shaft 10 having an interference fit with the sleeve 12. However, a second shaft 18 will most likely have a slightly different diameter owing to the inevitable tolerances in manufacturing. If the second shaft 18 has a larger diameter than the first shaft 10, then it will expand the split sleeve 12 a little bit, resulting in an interference fit for the second shaft 18 but not the first shaft 10. Now the first shaft 10 can slop in the split sleeve 12. If the second shaft 18 has a smaller diameter than the first, then it will wobble. No matter what happens one of the two shafts 10 or 18 will wobble within the split sleeve 12. To meet the cycle-to-cycle repeatability requirement this wobble must be less that 0.015 microns, so the diameter of the two shafts 10 and 18 must be equal to about 0.008 microns. This specification would require extremely expensive parts. However, for all practical purposes, meeting such a specification would be impossible to do.

What is needed is an inexpensive mechanical fiber optic switch that meets the cycle-to-cycle repeatability, long-term repeatability, and absolute misalignment specifications. Such a switch should use loosely toleranced commercially available off-the-shelf components and be easy to assemble without requiring fine alignment of the switch components and fibers. In addition, the switch should have a fiber mounting system that has minimum bearing wear and is insensitive to dimensional differences of the components. Further, the switch should have good stability over temperature.

SUMMARY OF THE INVENTION

Accordingly, the present invention is to an optical switch having at least a first optical transmission path rotating about a first independent and offset rotational axis for positioning the first optical transmission path on a first closed curve and at least a second optical transmission path rotating about a second independent and offset rotational axis for positioning the second optical transmission path on a second closed curve. The first and second optical transmission paths are in opposing relationship forming an optical interface with the closed curves of the optical transmission paths being laterally offset from each other for establishing intersecting points on the closed curves. First and second mounting members are provided for holding the respective first and second optical transmission paths with the first mounting member having a rotational axis axially aligned with the first independent and offset rotational axes and the second mounting member having a rotational axis axially aligned with the second independent and offset rotational axis. The first and second optical transmission paths are positioned off of the respective rotational axes of the mounting members. Means are provided for storing angular coordinates representative of the intersecting points of the first and second closed curves of the respective first and second optical transmission paths. Means are provided for axially aligning the first and second optical transmission paths at one of the intersecting points on the closed curves for coupling the measurement test instrument to the optical fiber link using drive motors coupled to the respective mounting members and responsive to the angular coordinates for selectively rotating the first and second optical transmissions paths relative to each other about their respective independent and offset rotational axes.

In still a further aspect of the invention the mounting members are positioned in individual, kinematically designed offset holder assemblies. In the preferred embodiment, the kinematic mounts are V-groove structures having an apex and angularly extending sidewalls forming a V-shaped cavity for receiving the respective mounting members. A spring clamp is positioned over the V-shaped cavity for securing the mounting members in a three-point cavity. The V-groove structures are formed from a material having substantially the same or greater hardness as the mounting members or have inserts secured to the sidewalls of the V-groove structures and the spring clamps that have substantially the same or greater hardness as the mounting members. The mounting members and the V-groove structures are preferably a borosilicate or ceramic material. The inserts are preferably hard materials, such as ceramic or sapphire.

In the preferred embodiment, the mounting members are first and second ferrules with each ferrule having a centrally disposed longitudinal axis about which the ferrule rotate, an outside diameter and a central bore for receiving the respective first and second optical fibers. The optical fibers may completely fill the ferrules with any one optical fiber lying substantially on the rotational axes of the ferrules not moving on a closed curve. Further, the optical interface ends of the ferrules have a sleeve member of ceramic material, which when polished provide separation between the first and second optical fibers. Alternately, the ferrules may be made of a ceramic material having a greater hardness than the interior optical fibers.

The axial aligning means includes means for selectively rotating the first and second optical transmission paths relative to each other about their respective independent and offset rotational axis. Means are provided for storing angular coordinates representative of the intersecting points of the first and second closed curves of the respective first and second optical transmission paths. The rotating means include first and second stepper motors or DC motors with high resolution encoders responsive to the angular coordinates of one of the intersecting points of the first and second closed curves for coupling rotational movement to the respective first and second optical transmission paths. First spur gears mounted to the respective stepper or DC motors transmit rotation movement to rotatable shafts via second spur gears mounted on the rotatable shafts. The rotatable shafts are coupled to the respective optical transmission path mounting members. The rotatable shafts include a first shaft element having a central bore for receiving the respective first and second optical transmission paths and a flexible drive shaft coupling for connecting the first drive shaft element to the respective optical transmission path mounting members. Also included are first and second bearings having a central bore for receiving the first shaft element of the rotatable drive shafts. Alternately, the rotating means may be first and second manually rotatable reduction gear assemblies coupled to transmit rotational movement to the respective first and second optical transmission paths.

The method for axially aligning the opposing optical transmission paths of the optical switch comprising the steps of (1) rotating the first optical transmission path on the first closed curve to one of the intersecting points in response to the angular coordinate representative of the position of the first optical transmission path at the intersecting point on the first closed curve and (2) rotating the second optical transmission path on the second closed curve to the intersecting point corresponding to the intersecting point in step (1) in response to the angular coordinate representative of the position of the second optical transmission path at the intersecting point on the second closed curve. In the preferred method these steps are performed simultaneously. An additional step in aligning the opposing optical transmission paths is to select the intersecting point on the closed curves closest to the optical transmission paths prior to rotating the first and second optical transmission paths to the selected intersecting point. A further set of steps in aligning the opposing optical transmission paths are: (1) rotating the respective first and second optical transmission paths past the selected intersecting point by the same amount; and (2) counter-rotating the first and second optical transmission paths simultaneously and stopping the optical transmission paths at the same time at the intersecting point. In an optical switch having a plurality of optical transmission paths rotating about the one or both of the independent and offset rotational axes, an additional step of selecting one of the plurality of optical transmission paths from the plurality of optical transmissions paths.

Certain conditions may occur which could damage the optical switch. Further steps of generating respective interrupt signals for stopping the respective drive motors if the drive motors drive past respective home positions and generating a user error code when this condition occurs. An additional validation step is performed when selecting an optical transmission path of the plurality of optical transmission paths. The selected optical transmission path has to be within selected limits established by the number of optical transmission paths in the plurality of optical transmission paths. A user error code is generated when the selected optical transmission path of the plurality of optical transmission paths is outside the selected limits. Steps may also be included to sum the angular coordinates of a current optical transmission path intersecting point with a newly selected angular coordinate of a optical transmission path to determine if the summed angular coordinates exceed a maximum range value. If this condition occurs a user error code is generated.

The optical switch is usable in a remote fiber test system having at least a first measurement test instrument for testing an optical fiber link having optical transmission fibers and an optical test fiber and at least a first optical switch for remotely connecting the measurement test instrument to one end of the optical fiber link, the optical switch including at least a first optical transmission path rotating about a first independent and offset rotational axis for positioning the first optical transmission path on a first closed curve with the first optical transmission path being coupled to the measurement test instrument, and at least a second optical transmission path rotating about a second independent and offset rotational axis for positioning the second optical transmission path on a second closed curve with the second optical transmission path being coupled to the optical fiber link. The first and second optical transmission paths are in opposing relationship forming an optical interface, with the closed curves of the optical transmission paths being laterally offset from each other for establishing intersecting points on the closed curves. First and second mounting members hold the respective first and second optical transmission paths with the first mounting member having a rotational axis axially aligned with the first independent and offset rotational axes and the second mounting member having a rotational axis axially aligned with the second independent and offset rotational axis. The first and second optical transmission paths are positioned off of the respective rotational axes of the mounting members. Means are provided for storing angular coordinates representative of the intersecting points of the first and second closed curves of the respective first and second optical transmission paths. Means are provided for axially aligning the first and second optical transmission paths at one of the intersecting points on the closed curves for coupling the measurement test instrument to the optical fiber link using drive motors coupled to the respective mounting members and responsive to the angular coordinates for selectively rotating the first and second optical transmissions paths relative to each other about their respective independent and offset rotational axes. An optical coupler, such as a wavelength division multiplexer or the like, couples the second optical transmission path to the optical test fiber. The measurement test instrument may be an optical time domain reflectometer, optical power meter, SDH/SONET test set or the like. A second optical switch may be added to the system for remotely connecting another measurement test instrument to the other end of the optical fiber link. The optical switch of the remote fiber test system may be provided with a plurality of optical transmission paths rotating about either or both of the independent and offset rotational axes for coupling multiplicity of measurement test instruments to multiple optical fiber links.

The objects, advantages and novel features of the present invention are apparent from the following detailed description when read in conjunction with appended claims and attached drawings.

BRIEF DESCRIPTION OF THE DRAWINGS

FIG. 1A–1C are respective idealized and real world representations of a prior art coaxial alignment scheme for a mechanical fiber optic switch.

FIG. 2 is a side view of the prior art coaxial alignment scheme for a mechanical fiber optic switch.

DETAILED DESCRIPTION OF THE PREFERRED EMBODIMENT

Figure 3:
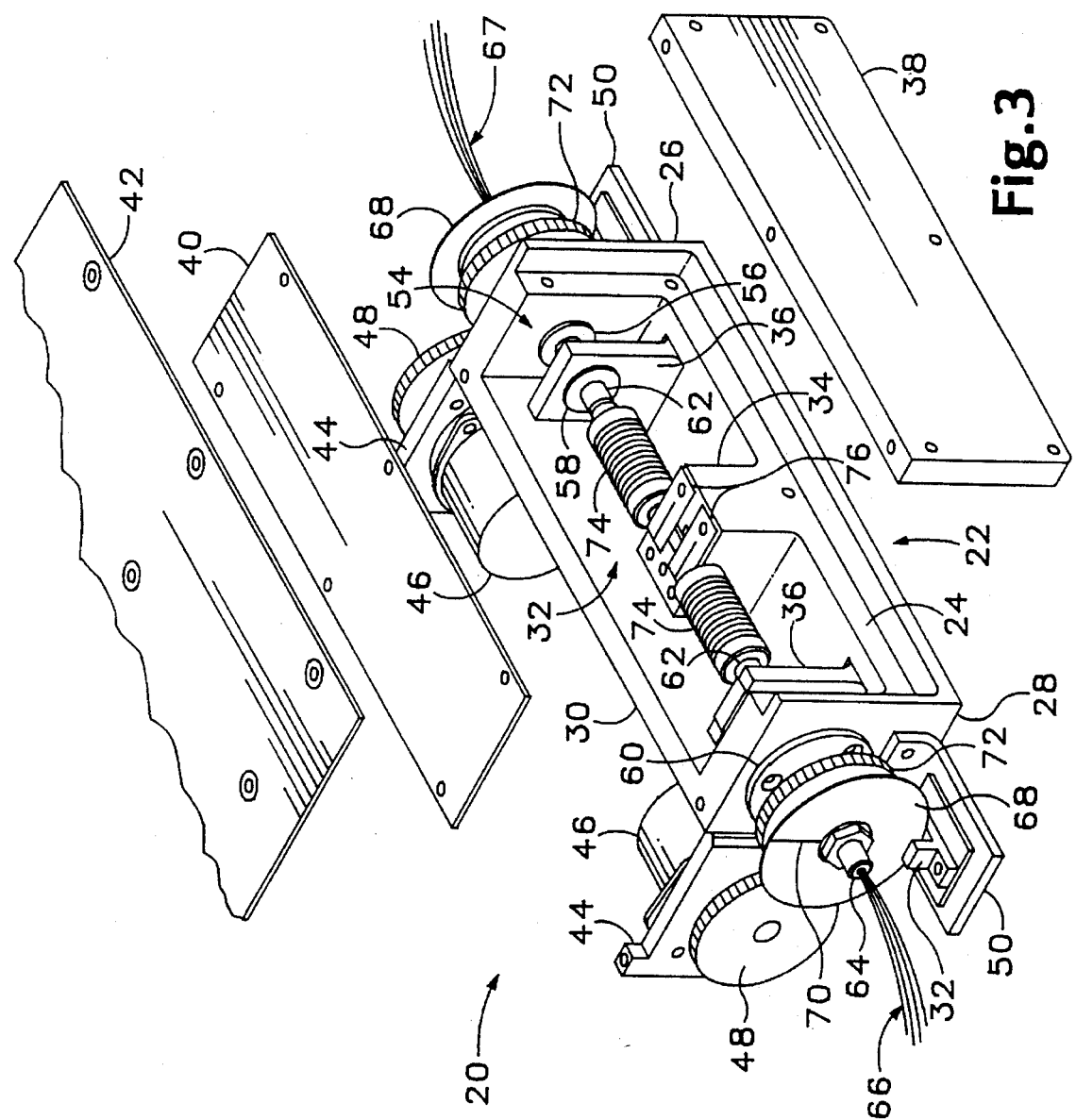
FIG. 3 is an exploded perspective view of the mechanical optical switch according to the present invention.

Referring to FIG. 3, there is shown an exploded perspective view of the mechanical optical switch 20 according to the present invention. One use for switch 20 is in remote fiber test systems. In such a system, the switch 20 connects a remote test unit, such as an optical time domain reflectometer, optical power meter, or the like, to various optical fibers in order to evaluate them. Another use is in conjunction with central office telephone switches for redirecting phone signals to a different optical fiber line when the original line is damaged.

Switch 20 has a housing 22 having a base 24, end walls 26 and 28, and sidewall 30 forming a partial cavity 32. Within the cavity 32 is a central pedestal 34 and bearing supports 36 rising from the base 24. The bearing supports 36 are disposed between the central pedestal 34 and the end walls 26 and 28. A removable sidewall 38 and top plate 40 are provided for enclosing the housing cavity 32. Mounted on top of the housing 22 is a circuit board 42 containing the electronic circuitry for the switch 20. The electronic circuitry contains a storage device or devices for holding angular coordinates related to intersecting points on closed curves between two opposing optical fibers. It also contain logic circuitry for validating requests to and functions of the switch and for generating interrupt commands for stopping switch functions and user error codes. Secured to the outside of the housing 22 adjacent to the end walls 26 and 28 are stepper motor brackets 44. Secured to each bracket 44 is a stepper motor 46. Extending from each stepper motor 46 is a shaft on which is secured a toothed spur gear 48. Mounted on the outside of each end wall 26 and 28 is a photodetector bracket 50. Mounted on each bracket is a photodetector 52 having a light emitting element and a light sensitive element.

A bore 54 is formed in each of the end walls 26 and 28. Bearings 56 are press fit into each bore 54 from the cavity 32 side of the end walls 26 and 28. Bearings 58 are also press fit into the bearing supports 36. Flange shaft seals (not visible in this figure) are mounted within each bore 54 from the outside of the cavity 32 and held in place by seal plates 60 mounted on the outside of the end walls 26 and 28. Extending through the seal plates 60, the flange shaft seals, and bearings 56 and 58 are rotatable drive shafts 62 having a central bore 64 for receiving input and output optical fibers 66 and 67. Mounted on each drive shaft 62 are slotted wheels 68 having a slit 70 formed therein. A portion of each slotted wheel 68 is positioned within a gap between the light emitting element and the light sensitive element of the photodetector 52. Also mounted to the rotatable drive shafts 62 are drive shaft spur gears 72 which engages the respective toothed spur gears 48 of the stepper motor 46. Secured to one end of each of the drive shafts 62 are flexible drive shaft couplings 74. Within the other end of the flexible couplings 74 are mounting members (not visible in this drawing) that hold the optical fibers 66 and 67 of the switch 20. Spring clamps 76 are mounted on the central pedestal 34 for hold the mounting members within offset V-grooves formed in the pedestal 34. The spring clamps 76 and the offset V-grooves form the holder assemblies for the mounting members, which will be described in greater detail below. The enclosed cavity 32 may be filled with an appropriate index matching fluid to reduce back reflections of the input light passing between the input fiber and output fiber. The index matching fluid also acts as a lubricant for the V-grooves and the bearings 58.

The housing 22, removable sidewall 38, and top plate 40 may be made of such materials as milled aluminum, stainless steel, or molded plastic. In the current design, these parts are milled aluminum. The rotating means in the form of the stepper motor 46 needs to achieve 0.14 degrees of rotational accuracy, be inexpensive, use relative little power and be small. An example of such a stepper motor 46 is manufactured and sold by HSI, Inc, Waterbury, Conn. under part number HSA33700. This particular stepper motor has an angular control specification to 0.09 degrees. Since the backlash is large for this particular motor a home position indicator is provided with the photodetector 52 and the slotted wheel 68. The photodetector 52 may be any commonly available device, such as the Sharp GP1L01F manufactured and sold by Sharp Corp., Camus, Wash. that generates an electrical signal when light passes from the light emitting element to the light receiving element. The slotted wheel 68 may be made of any appropriate material having adequate rigidity and capable of having a narrow slot formed in it. In the preferred embodiment, the slotted wheel 68 is formed from a 1 mil polycarbonate film having a 0.001 inch slot 70 formed therein. The film is laminated onto an aluminum stiffening plate. As an alternative to the steppers motors 46, DC motors having high resolution encoders may be used. The ferrule drive shaft 62 may be formed of any appropriate material that is substantially rigid and resistant to wear. In the preferred embodiment, the rotatable drive shaft 62 is a stainless steel rod having an outside diameter of one-forth of an inch. The central bore 64 has a diameter of one-tenth of an inch.

Figure 4:
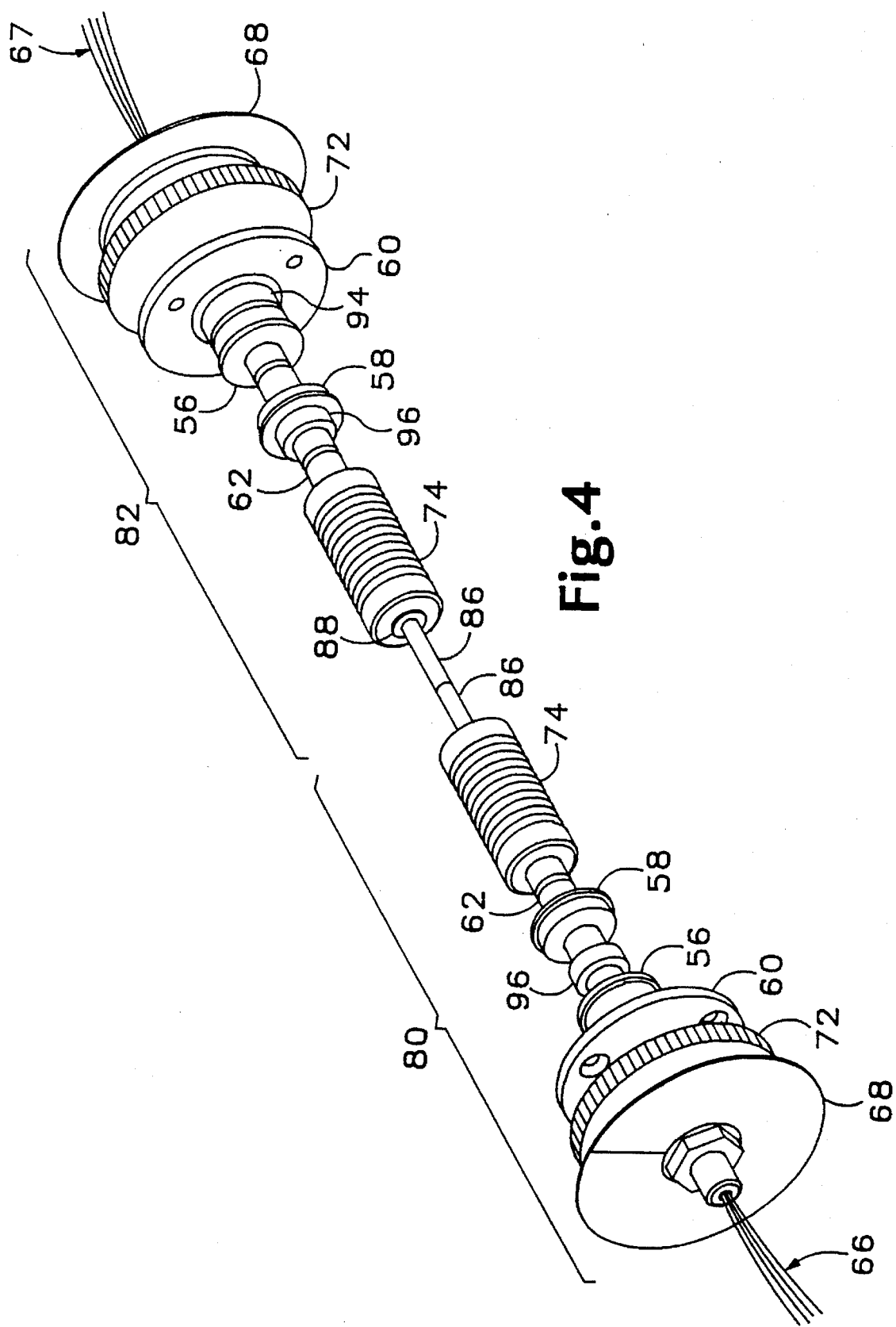
FIG. 4 is a perspective view of the ferrule drive assembly in the mechanical optical switch according to the present invention.

Referring to FIG. 4, there is shown a perspective view of the mounting member drive system for the mechanical optical switch 20. The drive system includes input and output sections 80 and 82 which are essentially the same with the exception of the positioning of the optical fibers within the mounting member, which will be described in greater detail below in relation to ferrules 86. The elements of the output section 82 are essentially the same as the input section 80. The output section 82 has the rotatable drive shaft 62 on which is mounted the slotted wheel 68 and the drive shaft spur gear 72. The drive shaft 62 passes through seal plate 60, the flange shaft seal 94, and bearings 56 and 58. Attached to one end of the drive shaft 62 is the flexible drive shaft coupling 74. The flexible coupling 74 is provided to reduce the lateral torque being applied to the ferrules 86 during rotational movement, which would cause misalignment of the optical fibers in the switch 20. An appropriate flexible coupling may be obtained from Servometer Corp., Ceder Grove, N.J. under part number FC-9. Secured to the opposite end of the flexible coupling 74 is ferrule 86 contained in a ferrule assembly 88. Within each ferrule 86 are secured the optical fibers 66 and 67 of the switch 20, which are in intimate opposing relationship to each other. To maintain this relationship, clamp collars 96 are mounted on the ferrule drive shafts 62 on either side of the inner bearings 58 to compress the flexible coupling 74 to keep the end faces of the ferrules 86 in compression.

Figure 5:
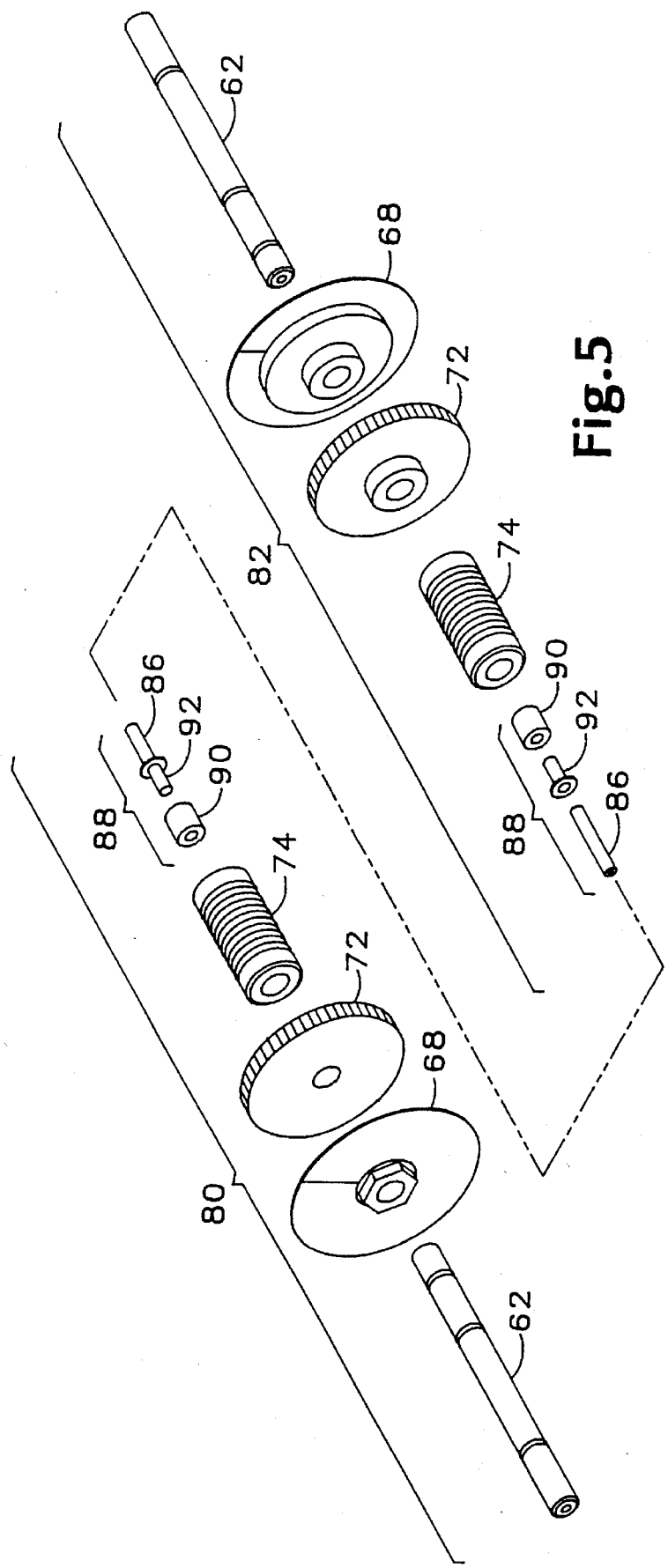
FIG. 5 is an exploded perspective view of the ferrule drive assembly in the mechanical optical switch according to the present invention.

Referring to FIG. 5, there is shown an exploded perspective view of the mounting member drive assembly. Elements in this figure are numbered the same as like elements in the previous figures. The ferrule assembly 88 consisting of a ferrule coupler 90 and the ferrule 86. In the preferred embodiment the ferrule coupler 90 is made of stainless steel but other suitable materials may be used. Alternately, a ferrule strain relief 92 may be secured within the ferrule coupler 90. A representative ferrule strain relief 90 may be purchases from Stimpson Co., Inc., Bayport, N.Y., under part number A3215. The ferrule 86 is secured in the ferrule coupler 90. The ferrule 86 is formed of a borosilicate industrial optics glass. A representative type of ferrule is the HC type manufactured and sold by Nippon Electric Glass, Des Plaines, Ill. This particular type of ferrule has an outside diameter tolerance of ±5 microns, an out of roundness specification of ±1 micron, and inside diameter tolerance of ±2 microns. As was previously described, using a ferrule with these tolerances in prior art optical switches would not provide the cycle-to-cycle repeatability, long, term repeatability, and absolute alignment required for a workable mechanical optical switch. However, applicant's mechanical optical switch 20 overcomes the mechanical tolerance problems of current mechanical optical switches by offsetting the ferrules 86 so as to rotate about independent axes instead of coaxially aligning and rotating the ferrules about a single axis as in the prior art.

Figure 6:
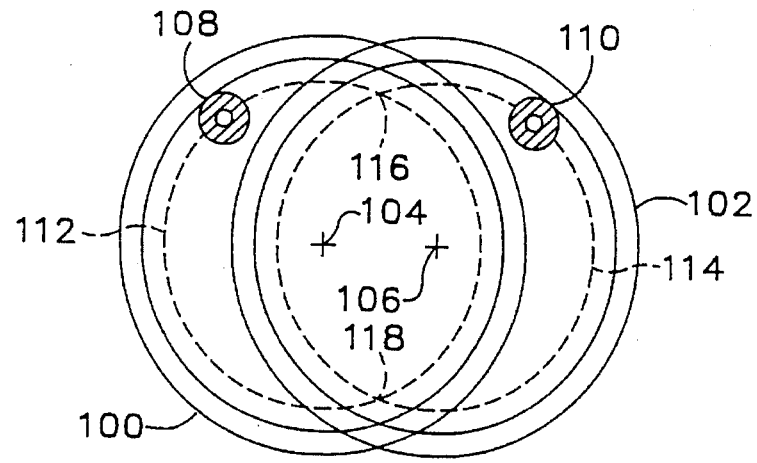
FIG. 6 is a diagrammatic representation of the offset ferrules in the mechanical optical switch according to the present invention.

Referring to FIG. 6, there is shown a representation of two opposing ferrules 100 and 102, rotating on independent axes 104 and 106, with each ferrule 100 and 102 containing an optical fiber 108 and 110 acting as an optical transmission path. In the preferred embodiment, the optical fibers are single-mode fibers having a core diameter of approximately 10 microns and an outside diameter of 125 microns. Other optical transmission paths may also be used, such as multimode optical fibers without departing from the scope of the invention. The opposing optical fibers 108 and 110 are positioned to move along closed curves 112 and 114 as the ferrules 100 and 102 are rotated. The close curves 112 and 114 intersect at points 116 and 118 on the respective curves. Assuming the curves 112 and 114 remain closed throughout the 360 degrees of rotation of the ferules 100 and 102, the intersection points 116 and 118 will be stable and will accurately represent the optimum alignment position for the two opposing fibers 108 and 110.

Figure 7A:
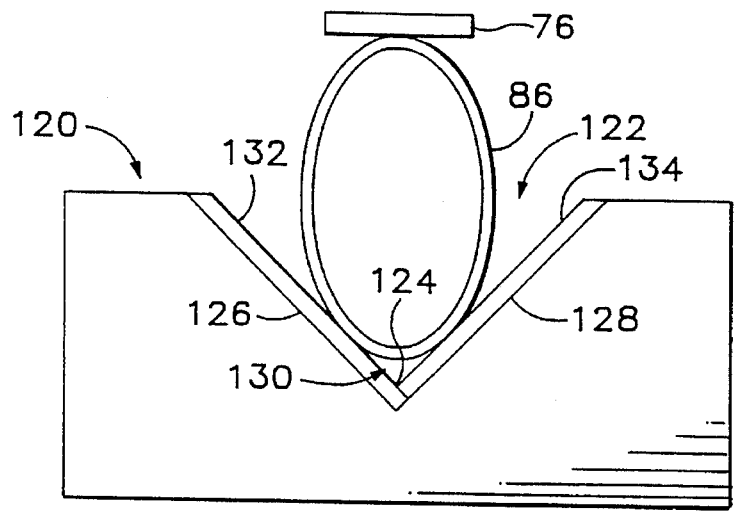
FIGS. 7A and 7B are end views of the kinematically correct holder assemblies in the mechanical optical switch according to the present invention.
Figure 7B:
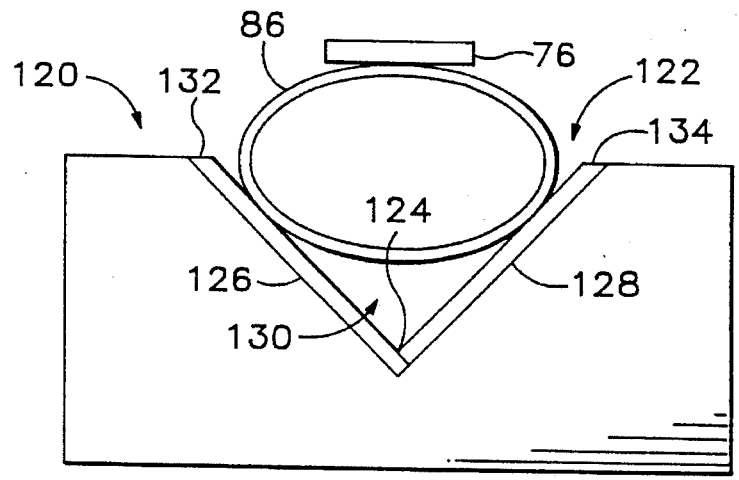

Referring to FIGS. 7A and 7B, there are shown end views of one of the two offset holder assemblies 120 formed or mounted on the pedestal 34 of the mechanical optical switch 20. Each holder assembly 120 has a V-groove structure 122 having an apex 124 and angularly extending sidewalls 126 and 128 forming a V-shaped cavity 130. Bonded to the sidewalls 126 and 128 are thin strips of wear resistant material 132 and 134, such as glass, ceramic, or the like. Configuring the holder assembly 120 in this manner allows the V-groove structure 122 to be formed from inexpensive materials, such as aluminum, plastic, or the like, while at the same time providing an extremely durable bearing. A more expensive, but possible design could use V-grooves made directly from the wear resistant material.

Ferrules 86, shown considerably out-of-round for illustrative purposes only, are respectively received in each of the V-groove cavities 130 formed on the pedestal 34. Spring clamps 76 are positioned over the cavities 130 to secure the ferrules 86 in the V-groove structures 122. The sidewalls 126 and 128 of each V-groove structure 122 provide two contact points for the ferrule 86 while the spring clamp 76 provides the third. This three-point mount is kinematically correct. A kinematic mount used in this specification means a mount with all forces resolved through a concurrent point. The retaining surfaces, the sidewalls 126 and 128 and the spring clamp 76, are tangent to the surface of the ferrule 86, resulting in a minimum energy configuration that is very stable, even when the ferrule 86 is not perfectly round. This compares to the prior art switches where the number of contact points is unknown, and varies from switch to switch, even during rotation. The spring clamp 76 in each holder assembly 120 is easily capable of small motion, so it can accommodate thermal expansion of the ferrule 86 or any out-of-roundness without slop (random movement) of the ferrule itself. Even if the ferrule 86 is considerably out-of-round the fibers inside the ferrule will still trace out closed curves. This eliminates any wobble caused by the dimensional variations between ferrules, as exhibited in prior art mechanical optical switches. It should be noted that the practice of this invention is not limited strictly to the V-groove structure and clamp configuration and other kinematically correct holder assemblies may be used without departing from the scope of the invention.

Bearing wear is a critical problem for any mechanical optical switch 20. The bearing wear on the V-groove structure 122 occurs only along a infinitesimally thin line on each sidewall 126 and 128 surface. However, wear on the ferrule 86 occurs along its entire surface. Assuming the thickness of the material removed through wear is inversely proportional to the surface area of the bearing, the wear rates on the V-groove structure 122 should be hundreds or thousands of times greater than those of the ferrule 86. Bonding the wear resistant strips 132 and 134 to the sidewalls 126 and 128 reduces the wear on the V-groove structure 122. Additionally, control of the switch can be designed so, on the average, both ferrules 86 rotate the same number of degrees during any 100,000 cycles. This would in theory result in even wear rates for both V-groove bearings so that the ferrules 86 settle into the respective V-groove structures 122 by the same amount, thus preserving their relative alignment.

Figure 8:
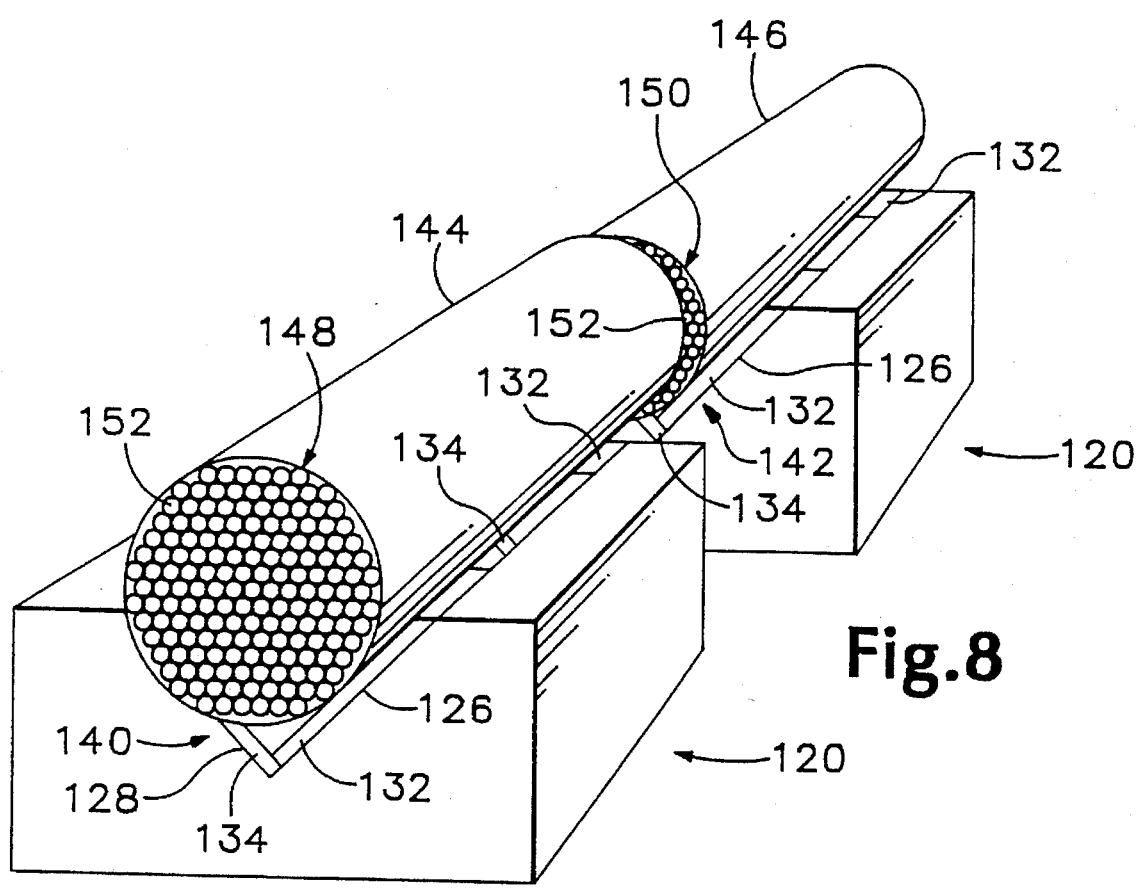
FIG. 8 is a simplified perspective of the offset input and output ferrules in the mechanical optical switch according to the present invention.

Referring to FIG. 8, there is shown a perspective view of the offset V-groove holder assemblies 120 formed on the pedestal 34 of the mechanical optical switch 20. Mounted in the V-grooves 140 and 142 are input and output ferrules 144 and 146 containing input and output optical fiber arrays 148 and 150. Each fiber array 148 and 150 may be formed of a single optical fiber 152 or multiple optical fibers. The outer walls of the ferrules 144 and 146 and the spring clamps 76 are not shown for clarity. The wear resistant strips 132 and 134 are shown in the currently preferred configuration where the separate wear resistant strips are bonded to the opposing ends of the sidewalls 126 and 128 of the V-grooves 140 forming a double ended bearing for the ferrules 144 and 146. The spring clamps 76, as shown in FIG. 3, are slotted to form first and second spring clamp members positioned over each set of wear resistant strips for securing the ferrules 144 and 146 in the V-groove cavity 130. Alternately, the wear resistant strips 132 and 134 may be configured to line the complete sides of the V-grooves 140. As is shown in the figure, the input ferrule 144 is slightly offset from the output ferrule 146. Because each ferrule 144 and 146 is highly constrained in its kinematically correct holder assembly 120, each fiber 152 of the input fiber array 148 traces out a closed curve when the input ferrule 144 rotates. These closed curves are approximately circles, but the actual shapes of the curves are not important. The curves could be ellipses, or any similar shaped closed curve. The same thing applies to the optical fibers 152 in the output fiber array 150. As was described with reference to FIG. 6, the closed curves of the optical fibers 152 in the input and output fiber arrays 148 and 150 are not concentric. That is any optical fiber 152 positioned to move on a closed curve in the input fiber array 148 will not be mirrored by any optical fiber 152 positioned to move on a closed curve in the output fiber array 150. The V-grooves 140 and 142 are deliberately offset in order to throw any input optical fiber closed curve out of concentricity with any output optical fiber closed curve.

Because the closed curves of the respective input and output optical fiber arrays 148 and 150 are not concentric, they intersect at exactly two points. It is because of this fact that perfect alignment is achieved between the optical fibers 152 of the input optical fiber array 148 and the optical fibers 152 of the output optical fiber array 150. Because there is no wobble or slop in the ferrule bearings, the kinematically correct holder assemblies 120, the curves are really closed, and because they are closed the angular coordinates of the intersection points are stable. This means that, for some angular coordinates of the input and output ferrules 144 and 146, an optical fiber 152 of the input fiber array 148 comes into perfect alignment with an optical fiber 152 of the output fiber array 150 at the intersection points. And, because the curves close, the angular coordinates are stable. They repeat over and over with extreme precision. Dynamically, if the trajectory of the system in phase space closes, then it is stable, periodic, and predictable. If the trajectory does not close, however, then the system can be chaotic.

Another important advantage is achieved by offsetting the input and output ferrules to rotate about independent and separate rotational axes. Each ferrules 144 and 146 may be loaded with any number of fibers 152. Some of the fibers 152 will be located about the edge of the inside diameter of the ferrules 144 and 146, and some will be located toward the center. By offsetting the ferrules 144 and 146, the closed curves scribed by the input fibers along the edge of the ferrule 144 can be made to intersect all of the output fibers of ferrule 146, even those that are located more toward the center. To do this, the offset between the two ferrules 144 and 146 should nominally be such that the closed curve traced out by the input fiber intersect the center of the output ferrule to within a tolerance of ½ the fiber diameter. In prior art designs, output fibers that are located near the center cannot be connected to input fiber that are on the edge. This means that an N×N switch can be built with more of its fibers concentrated toward the center than would be possible with prior art mechanical optical switches. This is an important advantage and objective of the invention because the angular tolerance required to achieve a given alignment decreases as the fibers move further from the center of the ferrule. So, when the fibers are far from the center of the ferrule, it requires more accurate angular resolution of the apparatus that rotates the ferrules. This would require, for example, the use of more expensive stepper motors 46 in the prior art designs whereas, in the present invention, less precise and therefore, less expensive stepper motors 46 can be used.

Another advantage and objective of the present invention is that the optical fibers 152 in the input and output optical fiber arrays 148 and 150 may be randomly configured in the input and output ferrules 144 and 146. That is, it is not necessary to arrange the fibers 152 in the array 148 and 150 in neat little patterns. Each fiber can follow its own closed curve. It make no difference to the operation of the switch, so long as the closed curves of all the input fibers 152 of the input fiber array 148 intersect the closed curves of all of the output fibers 152 of the output fiber array 150. Compare this design to the prior art where something is required to hold the fibers against the surface of the inside diameter of the ferrule or position the fibers on a concentric circle. Furthermore, that something must be very accurately dimensioned or the fibers will not be held tightly, and this will affect the concentricity, diameter, and roundness of the circles these fibers should travel.

An objective of the present invention is to produce a mechanical optical switch 20 that is easy to manufacture. As has been previously described, the mechanical optical switch 20 does not require precise positioning of the individual fibers 152 of the input and output fiber arrays 148 and 150 in the input and output ferrules 144 and 146 of the switch 20. The switch 20 of the present invention maybe configured as a 1×N switch having a single input port and multiple output ports or it may be configured as an N×N or N×M switch with multiple input ports and multiple output. In any configuration, the positioning of the optical fibers 152 is similar. In a 1×N switch, the input ferrule 144 is filled with optical fibers 152. Epoxy is added to the ferrule 144 to fill the voids between the fibers 152. All but one of the optical fibers 152 are then snipped at the end of the ferrule 144 leaving a single optical fiber 152 as the optical port. The same process is used for N×N and N×M optical switches with the exception that less or no fibers 152 are snipped. Likewise, the same process is used for producing the output ports for the switch 20. The important fact here is that no precise positioning of the fibers 152 within the ferrules 144 and 146 is necessary. This substantially reduces the manufacturing costs of the switch 20.

Alternately, a plug device may be used in forming the optical ports of the switch 20. The plug is positioned in the ferrules 144 and 146 and the fibers 152 are positioned between the plug and the inside wall of the ferrules. Epoxy is used to fill the ferrules 144 and 146. In either process, the ends of the ferrules 144 and 146 containing the fiber 152 are then ground and polished.

The input and output ferrules are then mounted in the holder assemblies 120 of the switch 20 and connected to the flexible couplings 74 of the ferrule drive system with the input and output fibers 66 and 67 (FIG. 3) passing through the central bores 64 of the ferrule drive shafts 62. It is worth noting that the assembly of the mechanical components of the switch is independent of the location of the optical fibers 152 in the input and output ferrules 144 and 146. As an example, the slotted wheels 68 are mounted on the ferrule drive shafts 62 without regard to the position of the fiber 152 within the ferrules 144 and 146. The positioning of the slots 70 in the wheels 68 to the photodetectors 52 establishes the starting reference points for the fibers 152 in their respective ferrules 144 and 146. The sidewall 38 is secured to the housing 22 and the cavity 32 is filled with an appropriate index matching fluid. The top plate 40 is secured to the housing and the switch 20 is ready for the alignment process.

Figure 9:
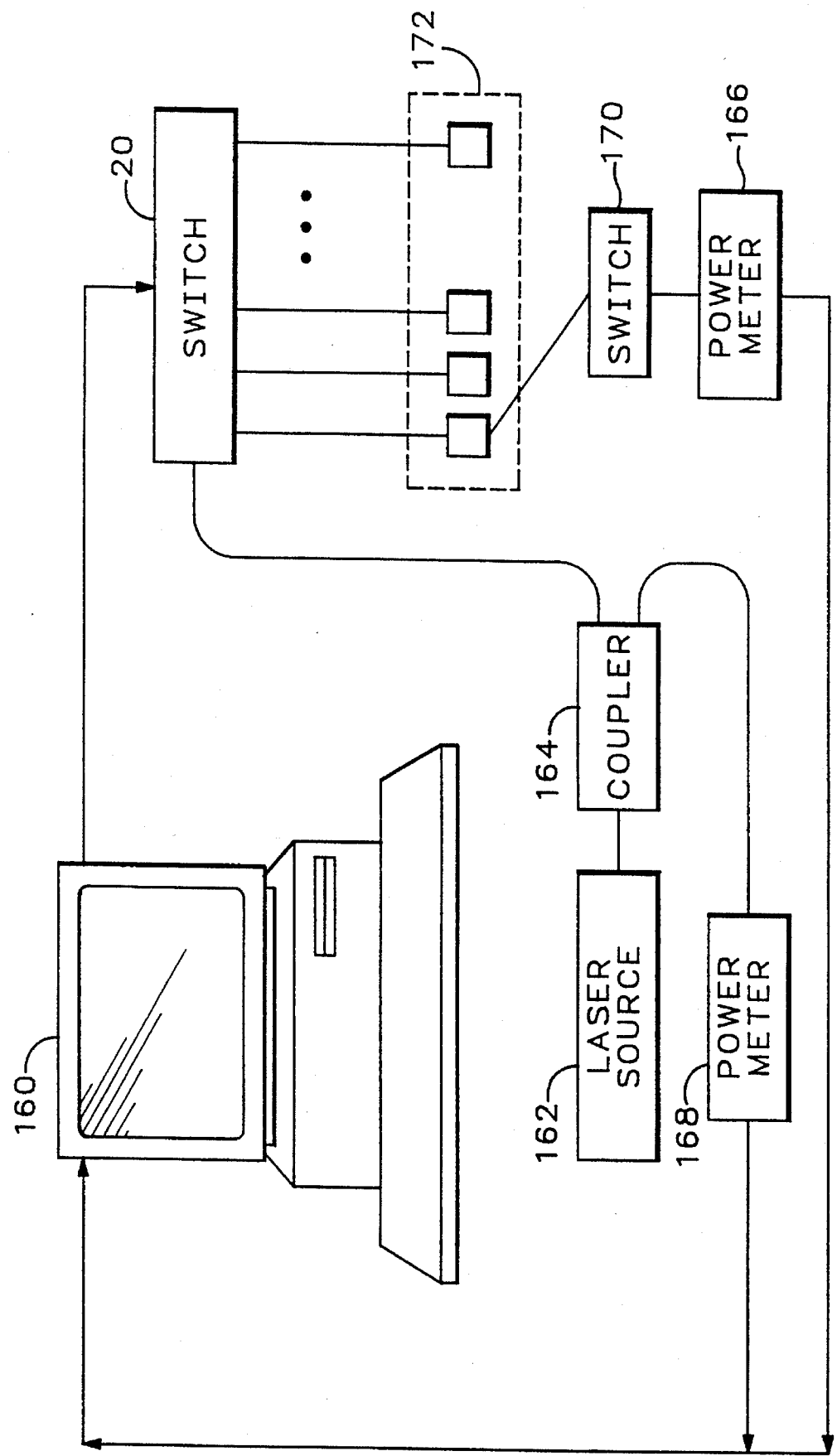
FIG. 9 is a representative alignment fixture for aligning the optical fibers of the input port with the optical fibers of the output port in the mechanical optical switch according to the present invention.

FIG. 9 shows an representative alignment fixture for determining the intersection points of the closed curves of the input optical fibers with the closed curves of the output optical fibers. It should be noted that any fiber 152 lying substantially on the axis of rotation of either of the ferrules 144 or 146 will not move on a closed curve but act as a point. For this reason, any fiber 152 on the axis of rotation of either of the ferrules 144 and 146 will not be used as an optical port. The alignment fixture has a controller 160, such as a computer, a laser source 162, either 1310 nm or 1550 nm, a single-mode coupler 164, two optical power meters 166 and 168, an electronic switch 170 and a bank of photodiodes 172. The computer 160 controls both the optical switch 20 and the electronic switch 170, and records the analog signals from the power meters 166 and 168. The computer locates the angular alignment coordinates of each port on the optical switch 20 by following a procedure as exemplified by the flow chart of FIG. 10. The threshold values in the procedure are not given since they may vary from fixture to fixture based on the laser light source used, the type of photodiodes employed and the type of power meters used.

Figure 11:
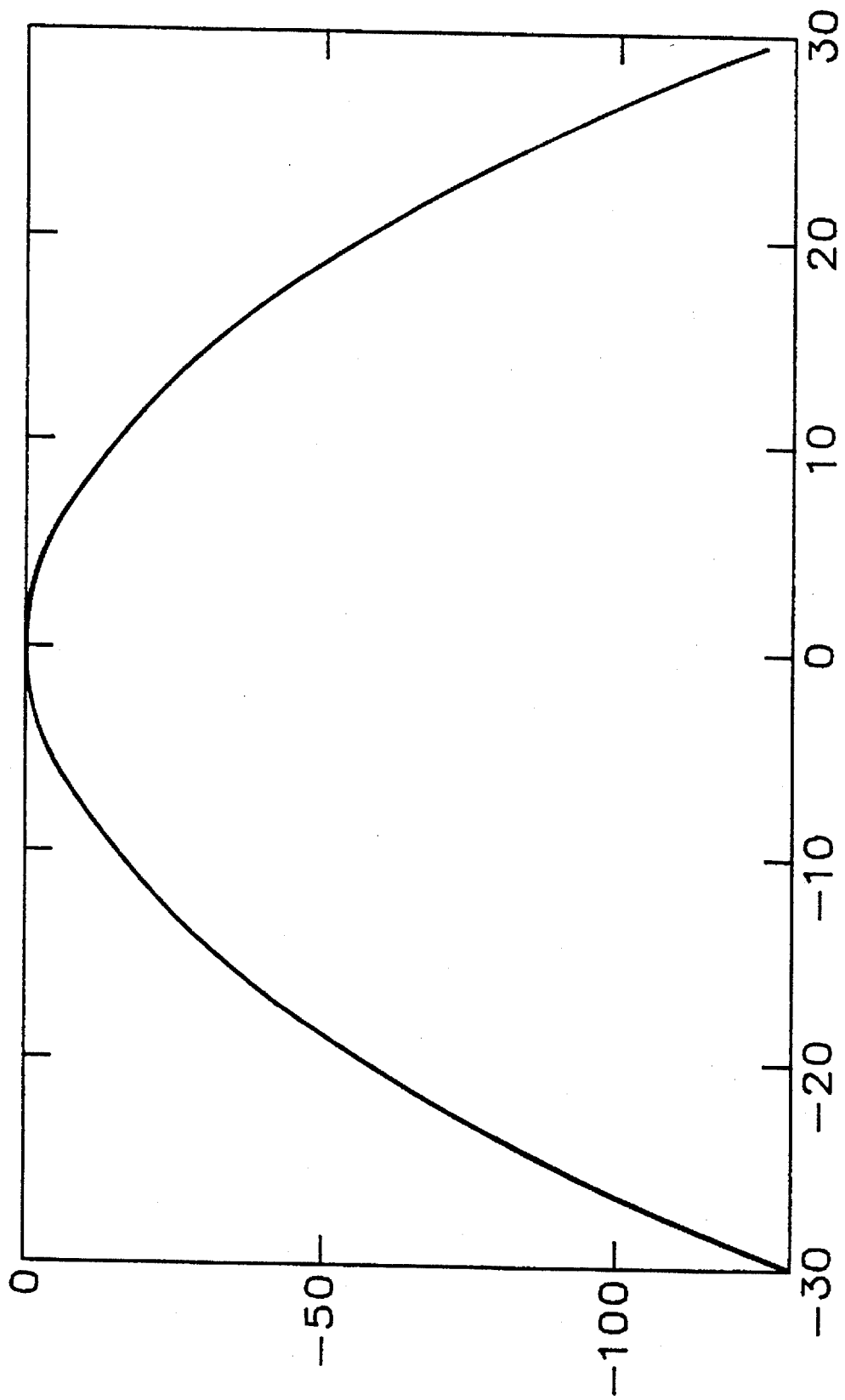
FIG. 11 is a graph representing a mathematical model for coupling between two misaligned optical fibers used in the alignment procedure for the optical ports in the mechanical optical switch according to the present invention.

The basic alignment procedure uses a mathematical model for coupling between two misaligned gaussian beams. This model is generally a good approximation for the optical transmission between misaligned single-mode fibers, since the fundamental modes of these fibers are nearly gaussian. The model assumes the two optical fibers are exactly identical, and that there is no longitudinal or angular misalignment between them. These assumption are valid since the ferrules 144 and 146 are ground and polished prior to installation in the switch 20 and clamp collars 96 are used to maintain the ferrules 144 and 146 in opposing contact. The mathematical model has previously been set forth in equation 1 where T is the optical transmission, x is the lateral offset between the two fibers and w is the $1/e^2$ radius of the irradiance profile of the fundamental mode. FIG. 11 illustrates this function plotted against a logarithmic scale. The function has a single maxima, obtained when the two fibers are exactly coaxial. The procedure locates this maxima by moving the first fiber, and then the second, in such a way as to maximize the optical transmission of the switch.

Figure 10A:
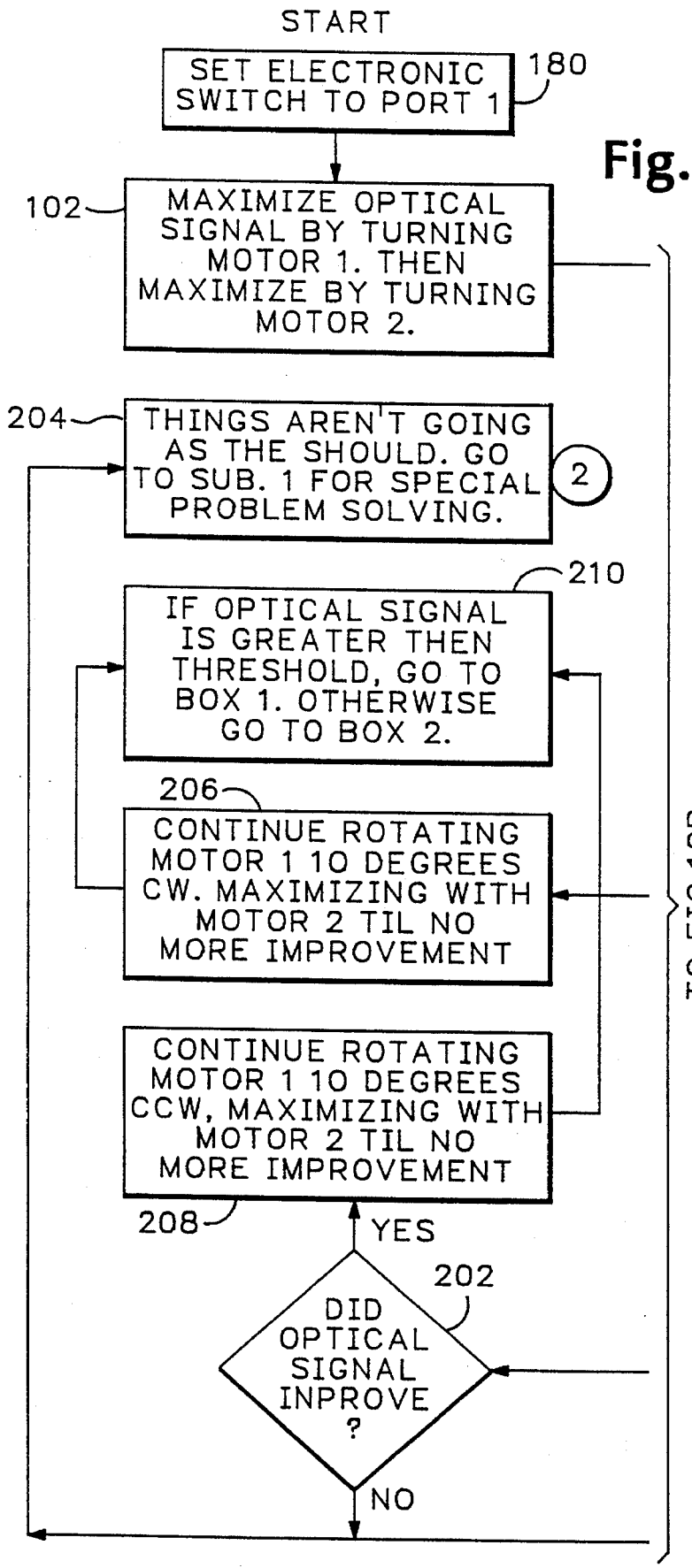
FIGS. 10A and 10B are a typical flow chart of a procedure for aligning the optical fibers of the input port with the optical fibers of the output port in the mechanical optical switch according to the present invention.
Figure 10B:
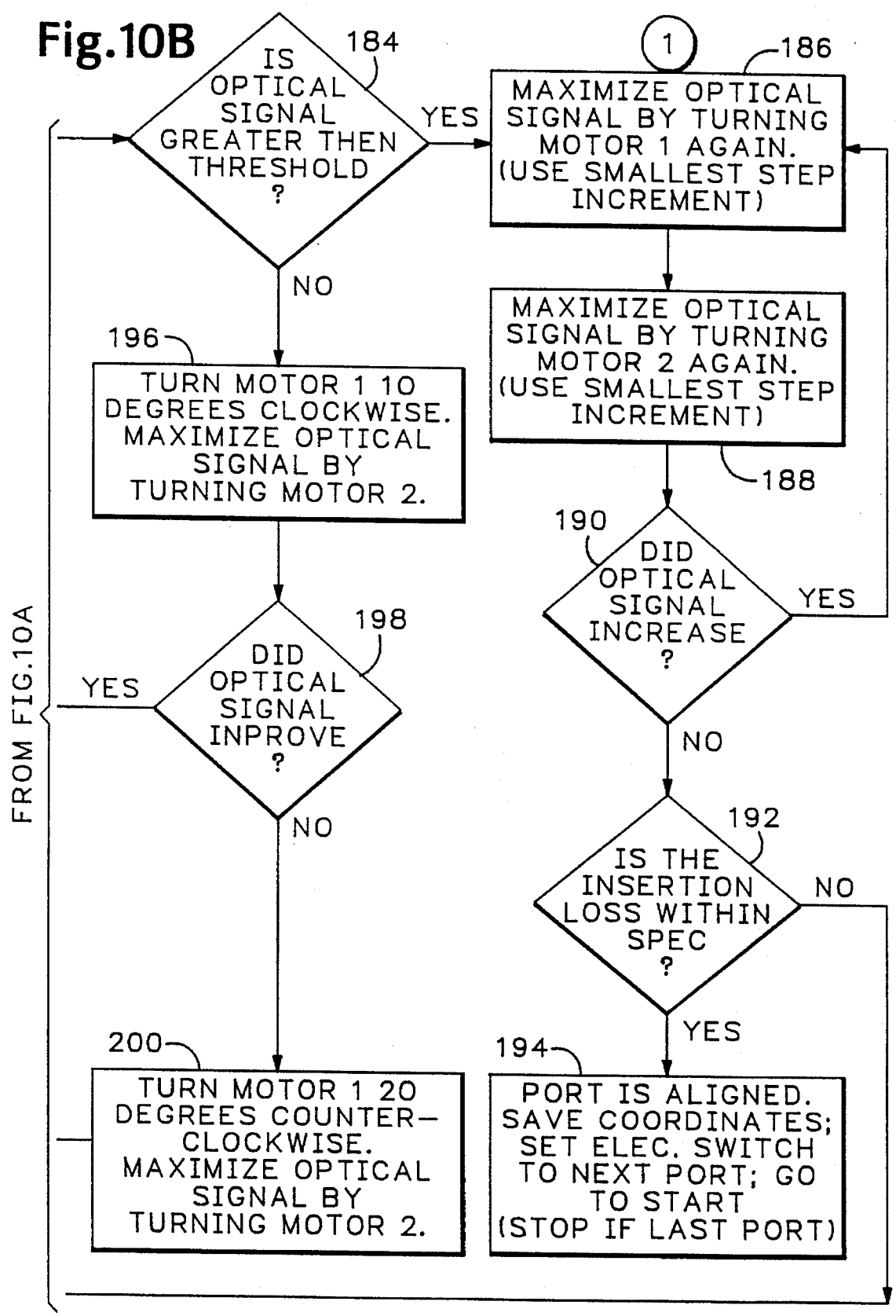

For the smooth curve shown in FIG. 11, the iterative procedure in FIG. 10 steadily converges on the maxima, where the two fibers are in exact alignment. In the real world, however, the curve is lumpy below a certain level, so at low light levels the curve has local maxima that can fool the procedure. These local maxima are much lower, by 20 to 30 dB, than the global maxima, so the procedure must not align to them, or the switch's insertion loss will be to high. This is the reason the procedure makes large steps (either clockwise or counter-clockwise) when the transmission is below some predetermined threshold, which may be called Local Maxima Threshold, or LMT. These small local maxima are generally only a few degrees wide, so by searching with 5 or 10 degree steps the procedure avoids them, finding its way above the LMT, usually within 5 degrees of the global maxima.

Although a preliminary search with large steps greatly diminishes the danger of inadvertently aligning the switch to the local maxima, the procedure is not fool-proof. As an extra precaution, the procedure checks the absolute transmitted power before deciding whether or not the port is properly aligned. If the absolute power is too low, but cannot be improved by adjusting the two motors (using the smallest step increment) then either the switch has a defective component, or it is aligned to a local maxima. If this happens, the procedure employs a special problem solving subroutine, labeled 1 in flow chart of FIG. 10.

The problem solving subroutine will use information about how bad the transmission efficiency is, in order to conduct another search using increments that are larger than the stepper motor's smallest step, but smaller than 10 degrees. It is believed that the LMT can be adjusted so that these types if problems will be very rare, in which case the procedure may simply try to align another port, and leave the difficult ones for an experienced human operator.

When aligning switches with many ports, it may be impractical to try to align the ports sequentially. Instead, it may he simpler to examine each of the output ports, seeing which is closest to the input port by measuring the optical power at each of the photodiodes, and align that one first. After aligning the first port, the procedure could align the next closest port. Generally, this procedure will align the output ports out of sequence, but it will be faster, and the procedure can always re-number the ports after completing the alignment procedure.

The procedure starts with the controller 160 rotating the input and output ferrule drive shafts 62 to their home positions. Their home positions are electrical signals from the photodiodes 52 when the slots 70 of the slotted wheels 68 pass between the light emitting elements and the light receiving elements of the photodiodes. The procedure sets the electronic switch 170 to port 1, box 180, and rotates the input ferrule 144 to maximize the optical signal at the port 1 photodiode 172. The output ferrule 146 is then rotated to maximize the optical signal, box 182. If the optical signal is greater than the thresholds, box 184, then the optical signal is maximized again by sequentially rotating stepper motors 46 for the input and output ferrules 144 and 146 using the smallest step increments, boxes 186 and 188. These steps are repeated until the optical signal no longer increases, box 190. If the insertion loss is within specifications, box 192, then the port is aligned. The number of degrees each stepper motor 46 has turned from their respective home positions are stored in a memory located on the circuit board 42 mounted on the switch 20. The electronic switch 170 is set to the next port and the ferrules 144 and 146 are set to the home position, box 194, where the process is repeated for the next port, box 180.

If the optical signal is less than the threshold after the first motor turning, box 184, then the procedure turns motor 1 in the range of 10 degrees clockwise and maximizes the optical signal by turning motor 2, box 196. If the optical signal does not improve, motor 1 is turned in the range of 20 degrees counter-clockwise and motor 2 is turned to maximize the optical signal, box 200. If the optical signal improves after the approximately 10 degree clockwise rotation or the approximate 20 degree counter-clockwise rotation of motor 1 and the maximizing of the optical signal by turning motor 2, boxes 198 and 202, then the routine continues in the appropriate direction with maximizing the optical signal with motor 2, boxes 204 and 206. If the optical signal is greater than the threshold after this process, then the routine jumps to that portion of the procedure where motor 1 and 2 are turned using the smallest increment, boxes 186 and 188. If the optical signal is greater than the insertion loss, box 192, then the port is aligned, box 194, otherwise the routine jumps to the special problem solving routine, box 186. If after the clockwise and counter-clockwise rotations of the motors, the optical signal is less than the threshold, box 210, then the routine jumps to the special problem solving subroutine, box 186.

The procedure of FIG. 10 is designed to find one of the two intersecting points on the closed curves of the input and output optical fiber defining optical ports. The procedure could easily be modified to find both intersection points. This would be advantageous for faster switching between ports of the optical switch 20 in that the closest intersecting point of the designated ports could be more quickly accessed. Further, the procedure just described assumes a blind search, that is nothing is known about the locations of the fibers 152 within the ferrules 144 and 146. An improved apparatus for and method of aligning fibers within ferrules 144 and 146 is shown in FIGS. 12 through 18. The alignment fixturing consists of an analytical station 220, shown in FIG. 12 and a measurement alignment station 230, shown in FIG. 13. The analytical station 220 includes a light source 221, such as a frosted florescent light, and an optical microscope 222, such as manufactured and sold by Buehler and used for examining the ferrules of fiber-optic connectors. The microscope is used with a 5× objective in the alignment implementation of the present invention. Depending on the number of fibers 152 in the input and output ferrules 144 and 146, the objective may be larger or smaller. For example, a 10× or 20× objective may be used for a lower port count mechanical optical switch 20 whereas a 2× objective may be used for a high port count mechanical optical switch 20. A black and white CCD camera 223, such as Model No. KP-M1 manufactured and sold by Hitachi Denshi, Ltd. is coupled to the microscope 222. The output of the CCD camera 223 is coupled to a video monitor 224, such as manufactured and sold by Hitachi Denshi under Model No. VM920/VM921. The video monitor 224 output is coupled to a frame-grabber 225, such as Computer EYES LPT, Model CAT-100. The output of the frame grabber 225 is coupled to a computer 226 containing Compute EYES frame grabber software. The measurement alignment station 230 includes a solid state laser 231, such as a 1310 nm or 1550 nm laser used in telecommunications transmission equipment, power meters 232 and 233, such the Model TFC200 Optical Power Meter manufactured and sold by Tektronix, Inc., and a computer 234. The individual computers 226 and 234 may be connected together via a network or may be a single computer shared by both stations. Irrespective of the configuration of the individual computers 226 and 234, the data output of the analytical station 220 is used by the measurement alignment station 230 for aligning the opposing fibers 152 within the ferrules 144 and 146.

Figure 12:
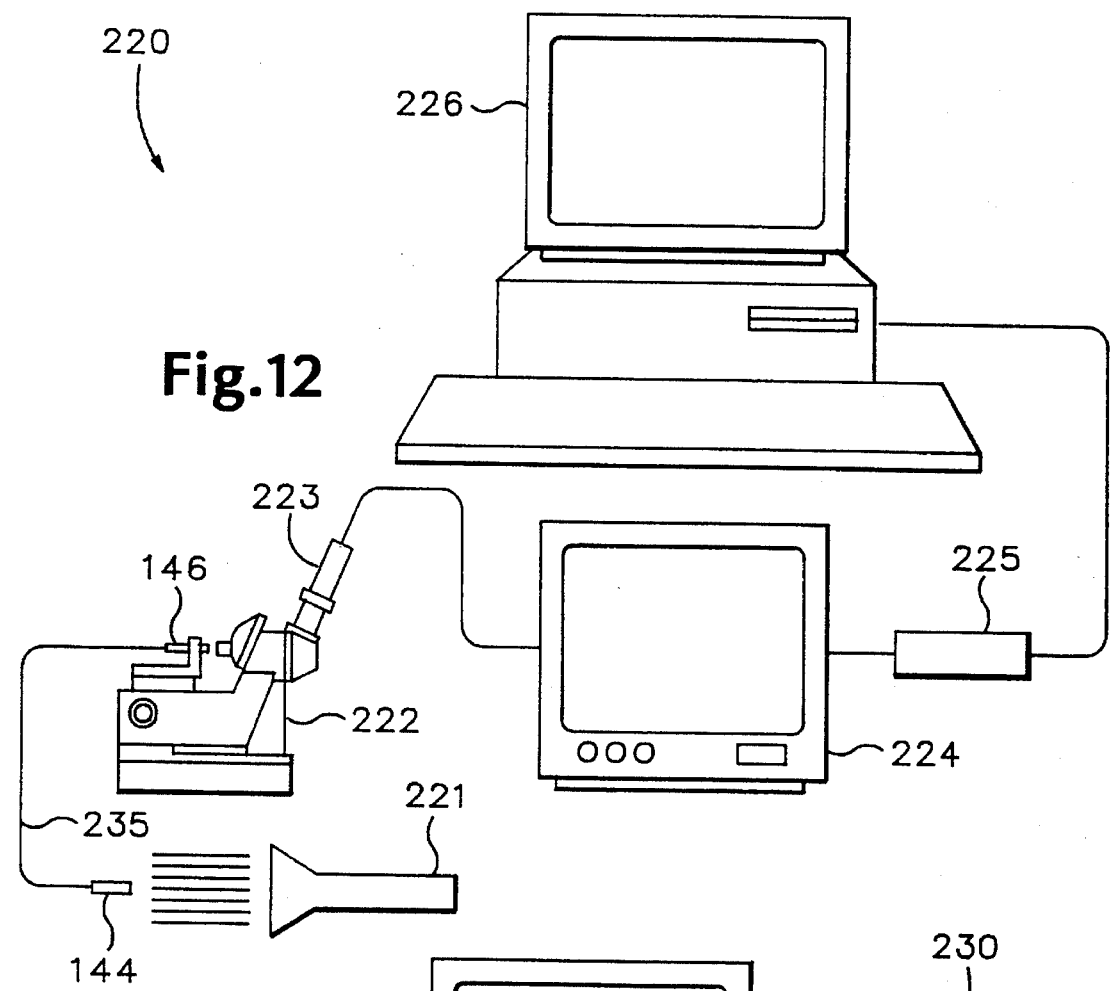
FIG. 12 is a representation of an analytical station of an alignment apparatus used for calibrating the mechanical optical switch according to the present invention.
Figure 13:
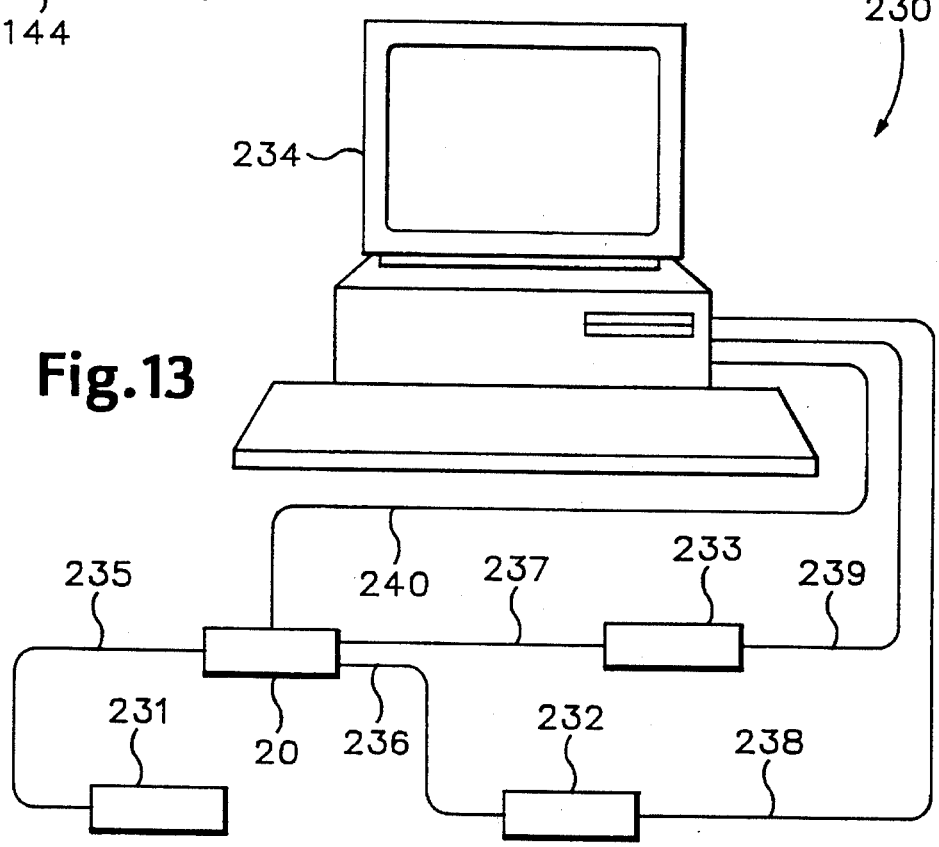
FIG. 13 is a representation of a mechanical alignment station of an alignment apparatus used for calibrating the mechanical optical switch according to the present invention.

The analytical station 220 acquires images of the respective end faces of the input and output ferrules 144 and 146 containing the optical fiber arrays 148 and 150 for determining the centers of each fiber 152 within the, ferrules 144 and 146, the axes of rotation of the respective ferrules 144 and 146 and the angular alignment coordinates of each fiber 152 within the respective ferrules relative to a reference point within each ferrule. The reference point for each ferrule is a fixed point within the ferrule that is discernable in the acquired images. In the preferred embodiment of the alignment procedure, the reference point is a multimode fiber, referred to hereinafter as the reference port. A multimode fiber is chosen because it is substantially larger in diameter than the single-mode fibers and is readily identifiable in the imaged end faces of the ferrules 144 and 146. This makes it much easier to find and singularly identify the reference port than if it where a single-mode fiber. The need for consistent, even illumination across the fiber 152 cores for imaging affects the procedure for building the ferrules 144 and 146. The same fiber array or bundle 235 is used for both the input and output ferrules 144 and 146 with the ferrules located at opposite ends of the fiber bundle 235 as shown in FIG. 12. This allows easy illumination of the fiber 152 cores by simply pointing the opposite ferrule toward the diffuse light source 221. After scanning the ferrules images into the computer, the fiber bundle 235 is cut in the middle to separate the two ferrule assemblies. The fiber bundle 235 consists of a number of single mode fibers and the multimode reference fiber. In a 1×N optical switch, all but one single-mode fiber is cut at the input ferrule 144. The measurement alignment station 230, operating under program control, selectively rotates the input and output ferrules of the assembled switch to optimally align the fiber or fibers 152 of the input optical fiber array 148 with the fibers of the output optical fiber array 150.

Figure 14A:
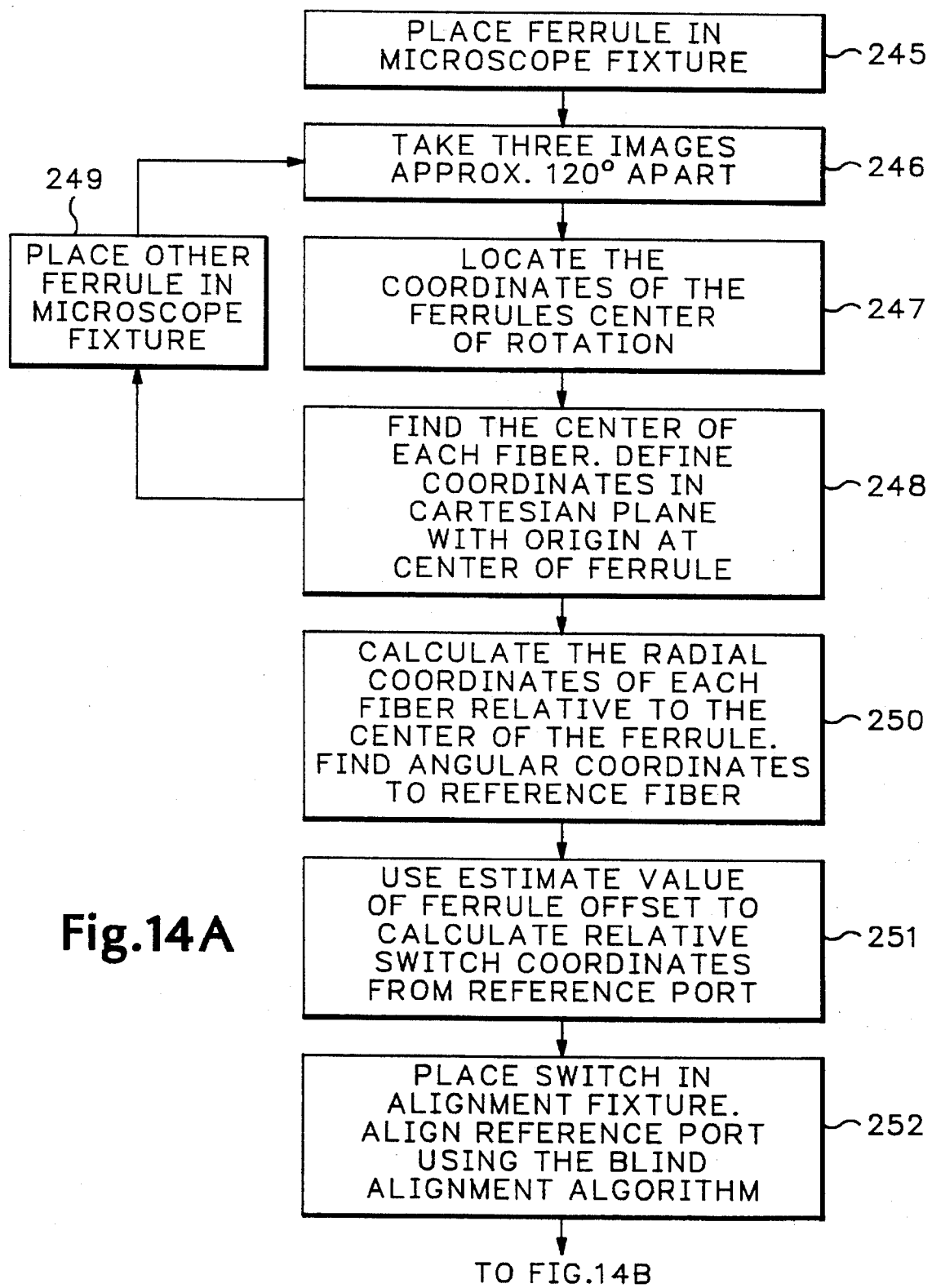
FIG. 14 is a flow chart of a procedure for determining the angular coordinates of intersecting points of opposing optical fibers of the input port and output port in the mechanical optical switch according to the present invention.
Figure 14B:
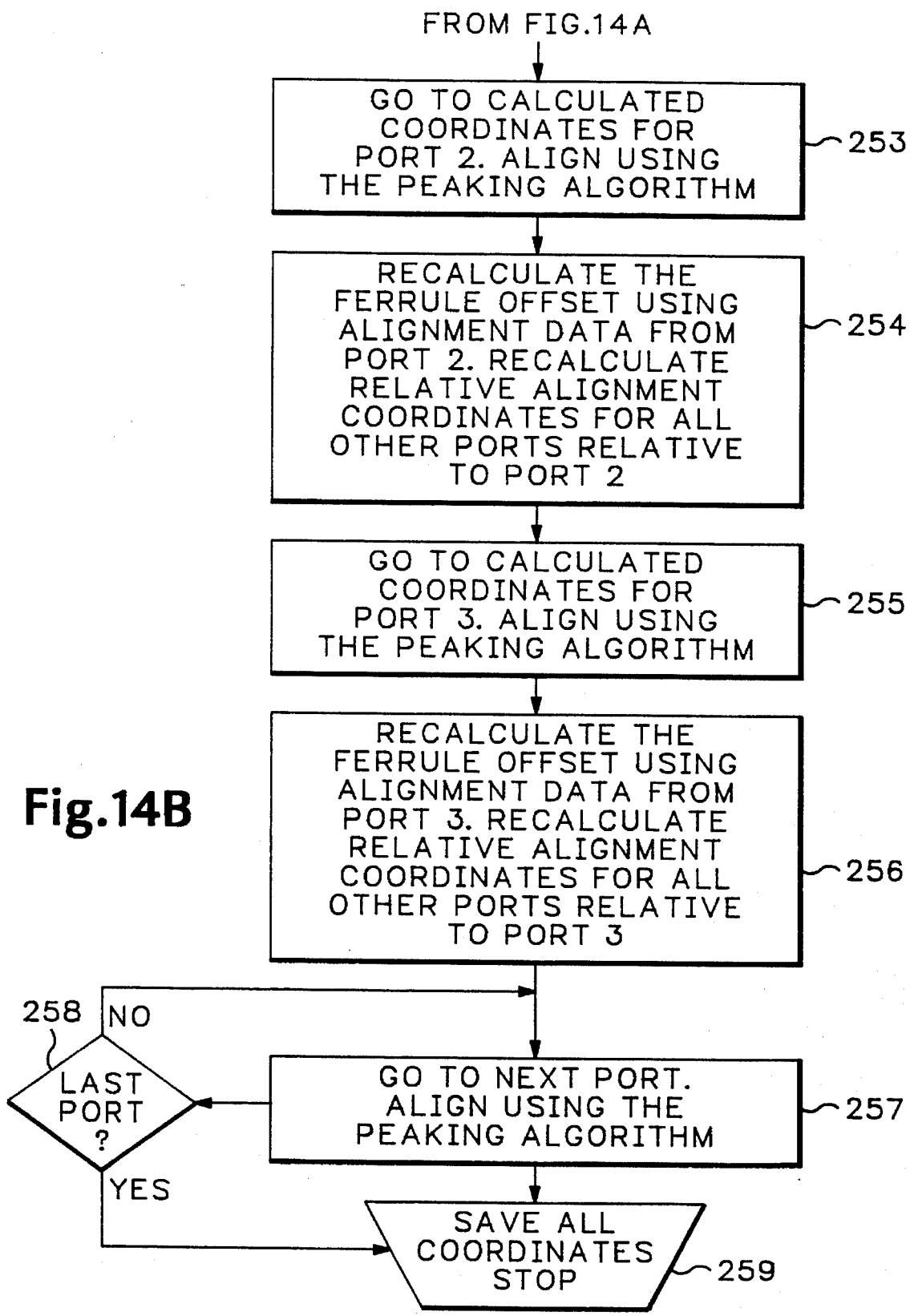

Referring to FIG. 14, there is shown a flow chart for aligning the fibers 152 of the input and output optical fiber arrays 148 and 150 disposed in the input and output ferrules 144 and 146 and for determining the angular coordinates for each aligned input fiber with an output fiber. The first step 245 of the procedure is to place one of the ferrules in a simple fixture, patterned after the V-groove structure of the switch, mounted on the microscope 222 stage. For explanation purposes, the output ferrule 146 is described below.

Figure 15:
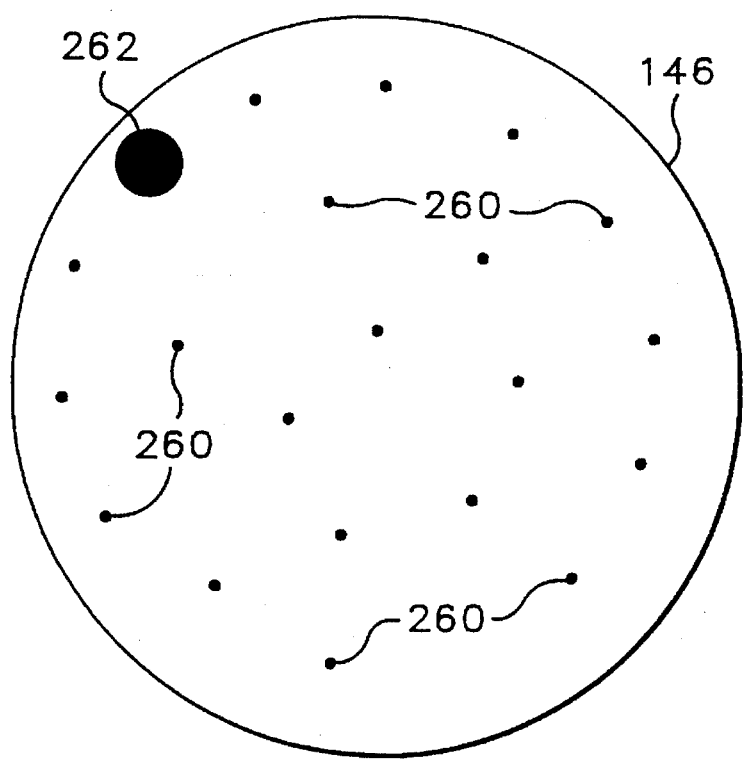
FIG. 15 is a representation of an inverted image of optical fibers in the output ferrule in the mechanical optical switch according to the present invention.

The next step 246 is to acquire three images of the ferrule, with each image at approximately one hundred and twenty degrees rotated from its position in previous image. The images are digitized and stored in the computer 226 for analysis. For example, the output ferrule 146 is imaged in the three orientations with the input ferrule 144 illuminated by the light source 221 and the microscope 222 light off. The acquired images are nearly binary, consisting of the illuminated cores of the fibers 152 on a black background. Because of the binary nature of the images, the fiber cores are relatively easy to find and accurately located. A typical location error is on the order of one-half of a pixel, or about one micron using a 5× objective in the microscope 222. FIG. 15 is an inverted image of the illuminated fibers 152 in the output ferrule 146. The small spots 262 are the illuminated cores of the single-mode fibers and the single large spot 262 is the illuminated core of the multimode reference port or fiber. A corresponding image of the input ferrule 144 for a N×N mechanical optical switch 20 would look similar to the output ferrule 146 image. An image of the input ferrule 144 in a 1×N mechanical optical switch 20 would show a single small spot for the single input fiber. Using rotated images of one of the fibers within the ferrules finds the true axis of rotation, even if the ferrule's inside and outside radii are not concentric. The only requirement imposed on the input and output ferrules' geometry is that the outside radius be approximately round.

The next step two steps 247 and 248 locate the center of each fiber and the coordinates of the ferrule's center of rotation. The alignment procedure locates the center of each ferrule by analyzing one of the stored images of the ferrule. The procedure compares each stored pixel to a threshold value. Any pixel value greater than the threshold is then compared to its eight neighboring pixel values to determine if it is greater than any of its eight neighboring pixels. If so, the average center of illumination is determined the region around the pixel equal to the fiber core size. The average center of illumination for each local maxima above the threshold value is stored as the coordinates of the fibers 152. The alignment procedure determines the true axis of rotation of the output ferrule 146 by analyzing the ferrule at different rotational orientations. The center of the multimode reference port 262 in the output ferrule 146 is determined for each of the three images and the center and radius of rotation is determined by solving the following three simultaneous equations:

$$(x_1-a)^2+(y_1-b)^2=r^2 \quad [4]$$

$$(x_2-a)^2+(y_2-b)^2=r^2 \quad [5]$$

$$(x_3-a)^2+(y_3-b)^2=r^2 \quad [6]$$

In these equations $(x_1, y_1)$, $(x_2, y_2)$, and $(x_3, y_3)$ are the coordinates of the fiber core in the three images, (a, b) is the coordinate of the center of rotation and r is the radius of rotation. The solutions are:

$$b=\frac{(x_3-x_2)(x_1^2-x_2^2+y_1^2-y_2^2)-(x_2-x_1)(x_2^2-x_3^2+y_2^2-y_3^2)}{2((x_2-x_1)(y_3-y_2)-(x_3-x_2)(y_2-y_1))} \quad [7]$$

$$a=\frac{(x_2^2-x_1^2+y_2^2-y_1^2)+2(y_1-y_2)b}{2(x_2-x_1)} \quad [8]$$

$$r=\sqrt{(x_1-a)^2+(y_1-b)^2} \quad [9]$$

The above equations locate the coordinates of the axis of rotation for the ferrule 146 and the image analysis determines the locations of each fiber 152 in the microscope's coordinate system for the output fiber array 150. A coordinate transformation determines the location of each fiber 152 in the output ferrule 146 in a coordinate system located on the rotation axis of the ferrule. Suppose that $x_{l_i}$ and $y_{l_i}$ are the coordinates of the i'th fiber in a general laboratory reference frame, while $x_{f_i}$ and $y_{f_i}$ represent their locations in a coordinate system centered on the ferrule's axis. Both coordinate systems are Cartesian, and their x and y axes are parallel. The coordinate transformation equations are:

$$x_{l_i}=x_{f_i}-a \quad [10]$$

$$y_{f_i}=y_{l_i}-b \quad [11]$$

where a and b represent the x and y coordinates of the center of the ferrule in the microscope's laboratory reference frame.

The next step 249 places the input ferrule 144 in the microscope 22 fixture. Three images of the end face of the input ferrules are acquired at three different rotational orientations and the three simultaneous equations are solved for (a,b) and r. The coordinates of the ferrule's axis of rotation is determined using either the multimode reference fiber 262 if the mechanical optical switch 20 is an N×N type switch or the single-mode input fiber if the switch 20 is a 1×N type switch. The track radius of the input fibers or fiber, or the distance from the rotational axis of the input ferrule 144 to the input fiber's core, is determined.

The next step 250 is to calculate the radial coordinates of each fiber Core 260 relative to the center of the ferrule 146 and to calculate the relative change in alignment coordinates for each fiber relative to the reference fiber 262. The offset distance of the V-grooves, which in turn is the offset distance of the ferrules, is approximately known from the specifications of the switch or can be measured directly with a micrometer. In addition, a convention for positive and negative rotation of the ferrules is defined. Positive rotation is defined as a counter-clockwise rotation when looking at the optical interface of either ferrule. Negative rotation is defined as clockwise rotation. The positive x-axis and y-axis have their origins at the center of the output ferrule with the x-axis extending to the right and y-axis extending upward at ninety degrees to the x-axis. In this convention, when both ferrules are rotating through positive angles in their own coordinate systems they are counter-rotating at the optical interface because they face in opposite directions.

The radii of the tracks on which each of the output fibers rotates and the angle between the line joining each fiber to the x-axis is determined by the following equations (with angle in degrees):

$$r_i = \sqrt{(x_i^2 + y_i^2)} \quad [12]$$

$\theta_i = a\tan(Y_i/x_i)$ if $x_i>0$ and $y_i>0$ (points are in the first quadrant) [13]

$\theta_i = a\tan(Y_i/x_i)+180$ if $x_i<0$ and $y_i>0$ (points are in the second quadrant) [14]

$\theta_i = a\tan(Y_i/x_i)+180$ if $x_i<0$ and $y_i<0$ (points are in the third quadrant) [15]

$\theta_i = a\tan(Y_i/x_i)+360$ if $x_i>0$ and $y_i<0$ (points are in the fourth quadrant) [16]

A further rotational transformation of the coordinates of the output fibers is performed so that the multimode reference fiber or port is positioned on the positive x-axis. The x–y coordinates of all the output single-mode fibers are calculated in this new reference frame. The same procedure is used for the input fibers in a N×N mechanical optical switch.

Figure 16:
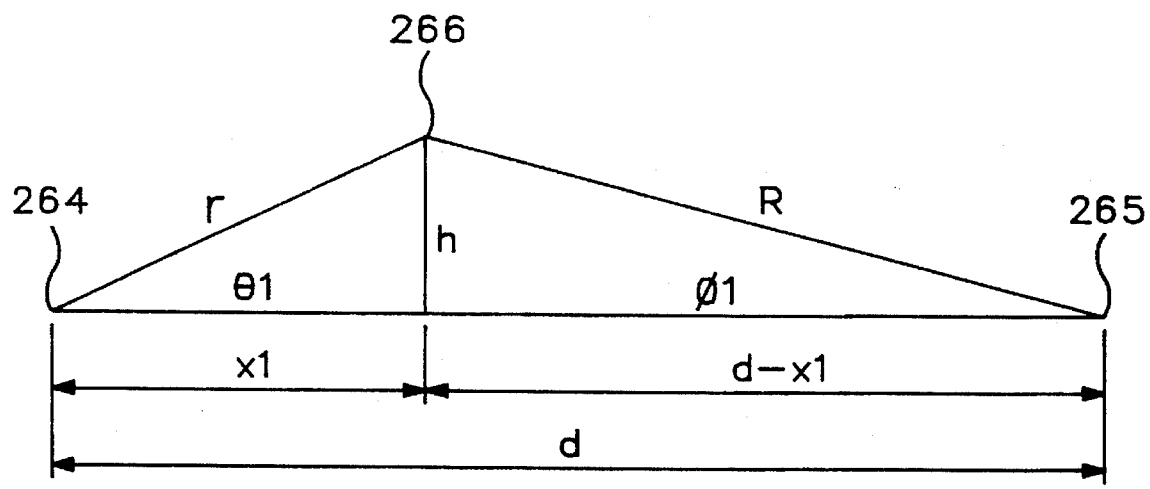
FIG. 16 is a representation of the alignment condition for an arbitrary input fiber in the mechanical optical switch according to the present invention.

The next step 251 uses the estimated value of the ferrule offset to calculate relative switch coordinates from the reference multimode port. FIG. 16 illustrates the alignment condition for an arbitrary input fiber. The distance between the centers of the two ferrules is the V-groove offset d when the ferrules having the same outside diameters. Ferrules of unequal diameters may be used without departing from the teaching of the invention. Points 264 and 265 are respectively the center of the output ferrule and the center of the input ferrule. Point 266 is the intersection point on the closed curves of the input fiber with one of the output fibers. From the geometry of triangles, the following equations are derived:

$$r \times \sin(\theta 1) = R \times \sin(\phi 1) \quad [17]$$

$$R \times \cos(\phi 1) = d - r \times \cos(\theta 1) \quad [18]$$

Solving equations 17 and 18:

$$\theta 1 = \frac{\pi}{2} - a\sin\left(\frac{d^2 - R^2 + r^2}{2dr}\right) \quad [19]$$

$$\phi 1 = a\sin\left(\frac{r \times \sin(\theta 1)}{R}\right) \quad [20]$$

Equations [19] and [20] give the alignment conditions for each fiber relative to the positive x-axis. Since each fiber's polar coordinates are known, the alignment coordinates for each fiber relative to the alignment coordinates of any other fiber can be calculated. The relative switch coordinates are passed to the measurement alignment station 230 where they are stored in computer 234 and used as the starting values for peaking the alignment of the input fibers or fiber with the output fibers.

Figure 17:
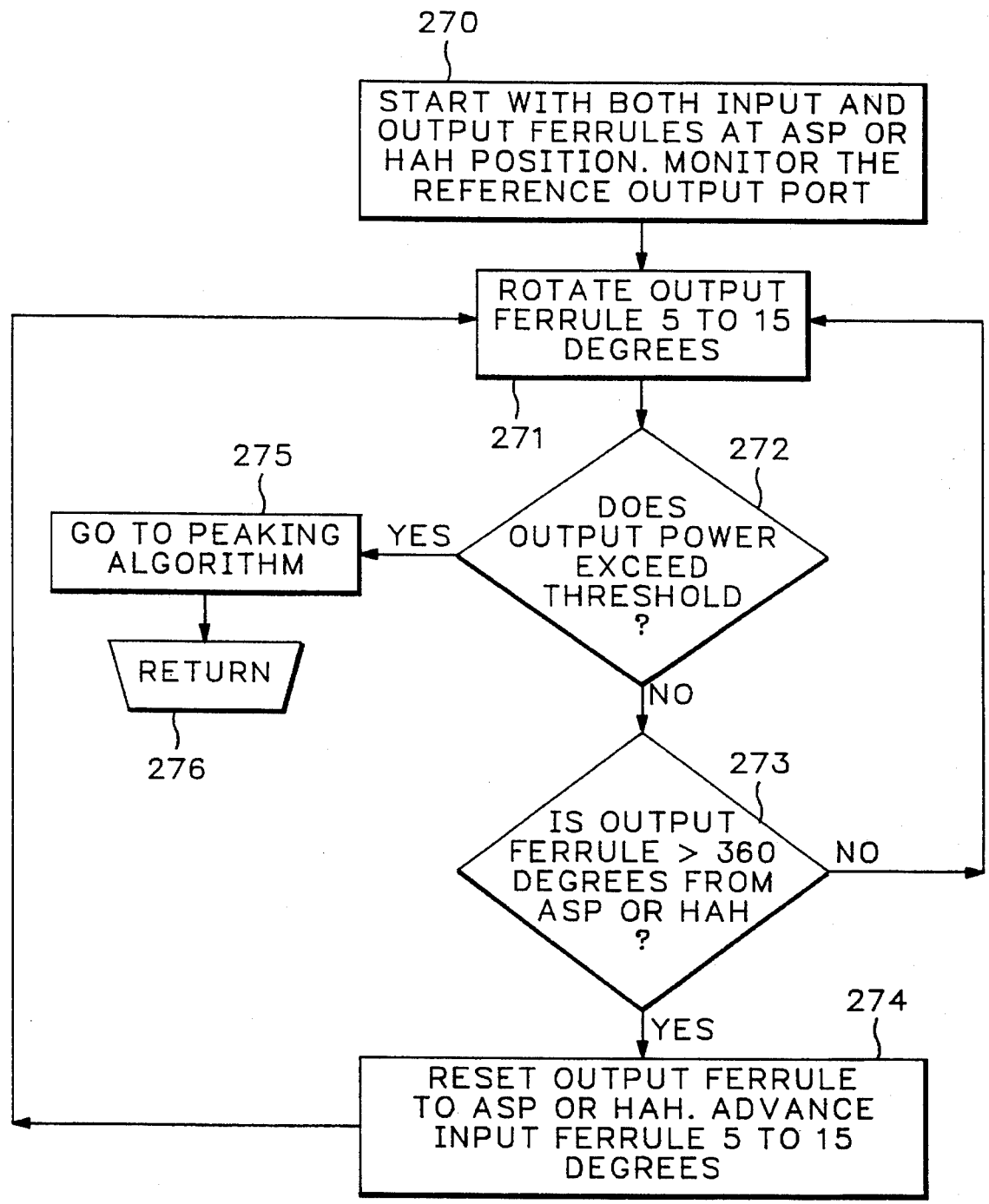
FIG. 17 is a flow chart of a blind search routine for locating a reference fiber in the mechanical optical switch according to the present invention.

As previously described, the fiber bundle 235 has the input and output ferrules 144 and 146 disposed at either end and contains the single-mode fibers and the multimode reference fiber and is cut in half after the alignment station steps. The ferrules are secured in the mounting members of the mechanical optical switch 20 and connected to the drive motors on the switch 20. The assembled switch is connected to the measurement alignment station 230 in step 252 with a laser source 231 coupled to the input single-mode fiber 235 as shown in FIG. 12. The single-mode fiber bundle 236 and the reference fiber 237 are respectively connected to the power meters 232 and 233. Power meter control cables 238 and 239 connect the power meters to the computer. A switch control cable 240 connects the optical switch to the computer. Step 252 further includes aligning the multimode reference port or fiber with the input single mode fiber using a blind search routine as shown in FIG. 17.

The input and output ferrules 144 and 146 are assembled in mechanical optical switch 20 without respect to the location of the reference port 262 and the input fiber to the home position sensors 52 of the switch 20. On initial power-up of the mechanical optical switch 20, the drive motors 46 coupled to each ferrule rotate to the home position defined by the sensors 52. The blind search routine may be initialized at this point to a Home-Away-From-Home position, which is one hundred and eighty degrees from the home position, but to speed-up the search an Operator may manually control the motor rotation to position the input single-mode fiber and the reference fiber in the same quadrant. The blind search routine starts with both the input ferrule 144 and the output ferrule 144 at the arbitrary start position (ASP) or the Home-Away-From-Home (HAH) position, block 270. In the below description of the blind search routine, the degrees of rotation at each step are illustrative and may be adjusted for some steps as experience dictates. In addition, the degrees of rotation will be a function of the number of single-mode fibers in the output ferrule 146. Further, even though the routines describe degrees of rotation, the actual data saved for the angular coordinates of the aligned fibers is in motor steps. The output ferrule is rotated through five to fifteen degree of rotation in block 271 and the output optical power from the reference fiber is measured and compared to a threshold in decision block 272. If the optical power output does not exceed the threshold and the output ferrules has not exceeded 360 degrees of rotation from the ASP or HAH position as shown in decision block 273, then the routine loops back and rotates the output ferrule by another five to fifteen degrees of rotation, block 271. If the output ferrule has exceeded the 360 degrees of rotations, then the output ferrule is reset to the ASP or HAH position and the input ferrule is rotated by five to fifteen degrees of rotation as shown in block 274 and the output ferrules is again rotated by five to fifteen degrees, block 271. The input and output ferrules are rotated until the output power measured by the optical power meter exceeds the threshold whereupon a peaking routine is executed, block 275.

Figure 18A:
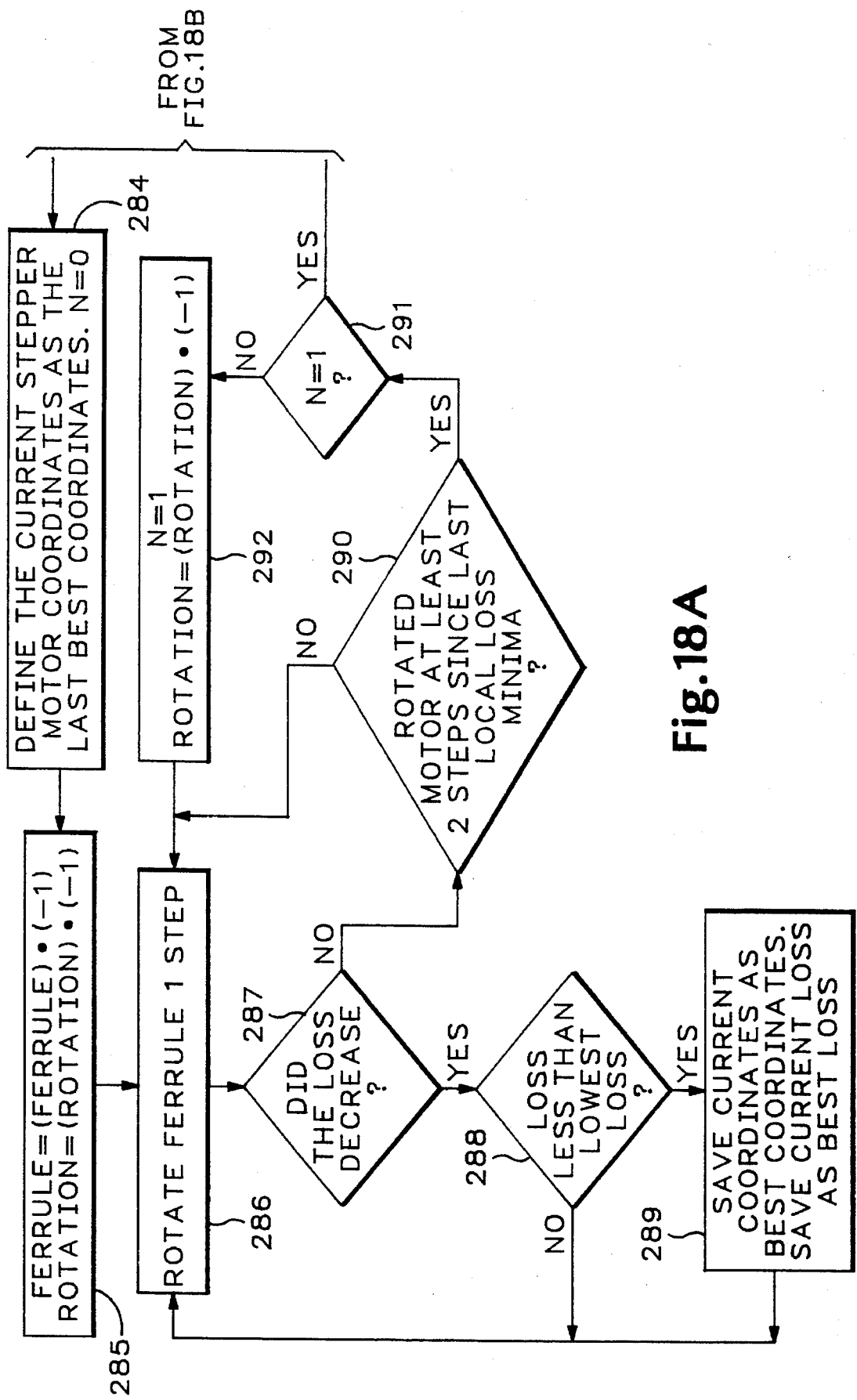
FIG. 18 is a flow chart for a peaking routine for optimizing the alignment of opposing fibers of the input port and output port and for returning the angular coordinates in the mechanical optical switch according to the present invention.
Figure 18B:
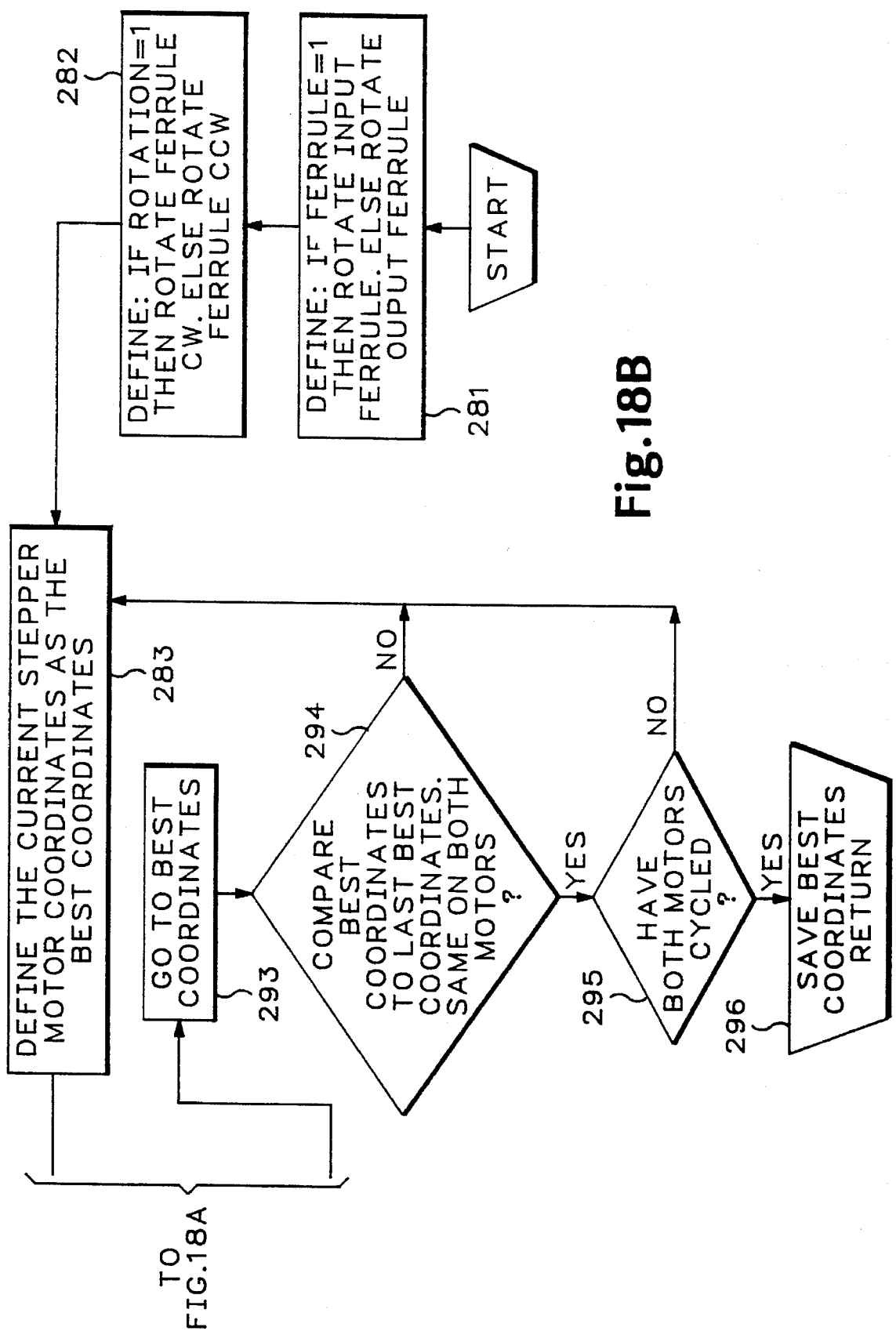

The peaking routine, shown in FIG. 18, starts by defining the input ferrule equal to one and clockwise rotation equal to one as shown in blocks 281 and 282. The current stepper motor coordinates are defined as the best coordinates as shown in block 282. The assumption is that there is some light coupled from the input fiber to the output fiber. The routine is initialized by defining the current stepper motor coordinates as the last best coordinates and setting a variable N to zero as shown in block 284. The routine initializes the ferrule to minus one and the rotation to minus one in block 285. That is, the output ferrule is rotated in a counter-clockwise direction on the first peaking pass. The routine starts with rotating the output ferrule in a counter-clockwise direction to determine the coordinates having the maximum amount of optical power coupled from the input fiber to the output fiber. The coordinates are saved as the best coordinates. These steps are shown in blocks 286 through 289. The routine continues past the best coordinates for two more steps, block 290, and then starts to rotate the output ferrule in a clockwise direction by setting N equal to one and the rotation equal to minus one, blocks 291 and 292. The routine determines the coordinates having the maximum amount of optical power coupled to the output fiber for the clockwise rotation of the output ferrule and saves the coordinates as the best coordinates, repeating blocks 286 through 289. With n equal to one the routine goes to the best coordinates, block 293, and compares the best coordinates to the last best coordinates, block 294. If they are not the same for both motors, the routine loops back through the routine, blocks 283 and 284 to redefine the current stepper motor coordinates as the best coordinates and the current stepper motor coordinates as the last best coordinates and reset N equal one. What has changed in the coordinates is the output ferrule stepper motor coordinate. The routine then switches to the input ferrule by setting the ferrule to a positive one (−1 ×−1=1), block 285. The input ferrule is rotated in both the counter-clockwise and clockwise direction to determine the best coordinate for the input ferrule, repeating blocks 286 through 292. After the best coordinate for the input ferrule is determined the routine compares the best coordinates to the last best coordinates, block 294, to determine if they are the same for both motors. If the result is yes, the routine determines if both motors have cycled, block 295. If the results yes, the best coordinates are saved as the optimum alignment positions for the input fiber and the selected output fiber, block 296. The routine then returns to the blind search routine or the routine that called it. The blind search routine then returns to the alignment routine. The number of steps from the home position of each stepper motor to the alignment point is saved as the coordinates of the intersection point.

The alignment routine proceeds to the coordinates for port number two, step 253, which is the first single-mode fiber, and uses the peaking routine previously described, to determines the optimum coordinates for maximum light throughput from the input fiber to the output fiber. The routine recalculates the ferrule offset using the alignment data from port two, step 254. Equation [19] gives θ1 as a function of r, d, and R. Although θ1 is not known, the change in θ1 is known as a function of aligning port two using the peaking routine. The change in θ1 is the difference between the calculated angular coordinate for port two and the alignment coordinate found using the peaking routine. The assumption is that the error is due to the estimate of the offset d, and as such the derivative of equation [19] can be used to estimate a correction factor for the offset. Using the correction factor, the value of offset d can be altered and new alignment coordinates can be recalculated for the fibers. This procedure may be followed each time a new port is aligned, until the changes in alignment coordinate falls below some preset threshold.

Taking the derivative of equation [15] with respect to d, rearranging, and replacing differentials with deltas:

$$\Delta d_i = \Delta\theta \times d_{est} \frac{\sqrt{(-d_{est}^4 + 2d_{est}^2(R^2 + r_i^2) - R^4 + r_i^2(2R^2 - r_i^2))}}{d_{est}^2 + R^2 - r_i^2} \quad [21]$$

$$d_{new} = d_{est} + \Delta d_i \quad [22]$$

The routines goes to the calculated coordinates for port three, step 255, and aligns the port with the input fiber using the peaking routine. The routine again recalculates the ferrule offset using the port three alignment coordinates and recalculates the relative alignment coordinates for all the other ports relative to port three, step 256. The routine goes to the next port and each succeeding port and aligns the fibers using the peaking routine, step 257. Each time a port is aligned the routine determines if it is the last port, step 258. When the last port has been aligned, the routine stops, step 259. The stored best coordinates for each of the aligned ports are read into memory circuits on the switch and stored. The switch 20 is now ready for use.

As has been previously described, the mechanical optical switch of the present invention may be configured with any number of input and output fibers or ports. The basic operation of the switch is to rotate the input or first optical fiber on its closed curve to one of the two intersecting points on its closed curve in response to the angular coordinate representative of the position of fiber at the intersecting point matching the intersecting point of the second optical fiber. The output or second optical fiber is rotated on its closed curve to the intersecting point corresponding to the intersecting point of the first fiber in response to the angular coordinate representative of the position of the second fiber at the intersecting point. These rotational movements may be performed sequentially, but in the preferred embodiment they are performed simultaneously. Since the offset closed curves intersect at two unique points, the speed of the switch may be increased by selecting the intersecting points closest to the input and output fibers prior to rotating the fibers.

Testing has shown that one ferrule can move the other when it rotates in the same sense as the other, after the other ferrule has stopped rotating. To overcome this problem each fiber is rotated past the selected intersecting point by the same amount and then both are counter-rotated simultaneously and stopped at the same time at the intersecting point. Testing has also shown that one or both of the input or output rotating sections of the switch can continue turning their drive lines until the fiber break or the motors stall. The switch has been configured to generate an interrupt signal when either of the motors drive the drive line assemblies more than one or one and one/half times from their respective home positions. The reflectors or slotted wheels attached to the respective drive line assemblies pass light to the respective detectors at the home position. A user error code is generated when this condition occurs and the motors stops.

An invalid fiber or port request can be issued to the switch. For this reason, each input and output fiber or port selection is validated prior to rotating the input or output sections of the switch. Maximum limits are set for the input and output sections based on the number of fiber in the respective sections. If the fiber or port request exceeds the maximum limits, a user error code is generated and the sections remain stationary.

In switch configurations where the input and output sections have multiple fibers or ports, individual fibers are selected for either the input or output sections prior to rotating the sections. It is possible when selecting a new fiber or port for the maximum fiber or port position to be exceeded. To prevent this condition from damaging the switch, the angular coordinate to the intersecting point of a newly selected fiber or port is summed with the angular coordinate of the intersecting point of the previously selected fiber or port. The summed angular coordinate value is compared to a maximum range value and a user error code is generated when the summed angular coordinates exceed the maximum range value. The angular coordinates in the preferred embodiment are stored as steps of the stepper motor.

Figure 19:
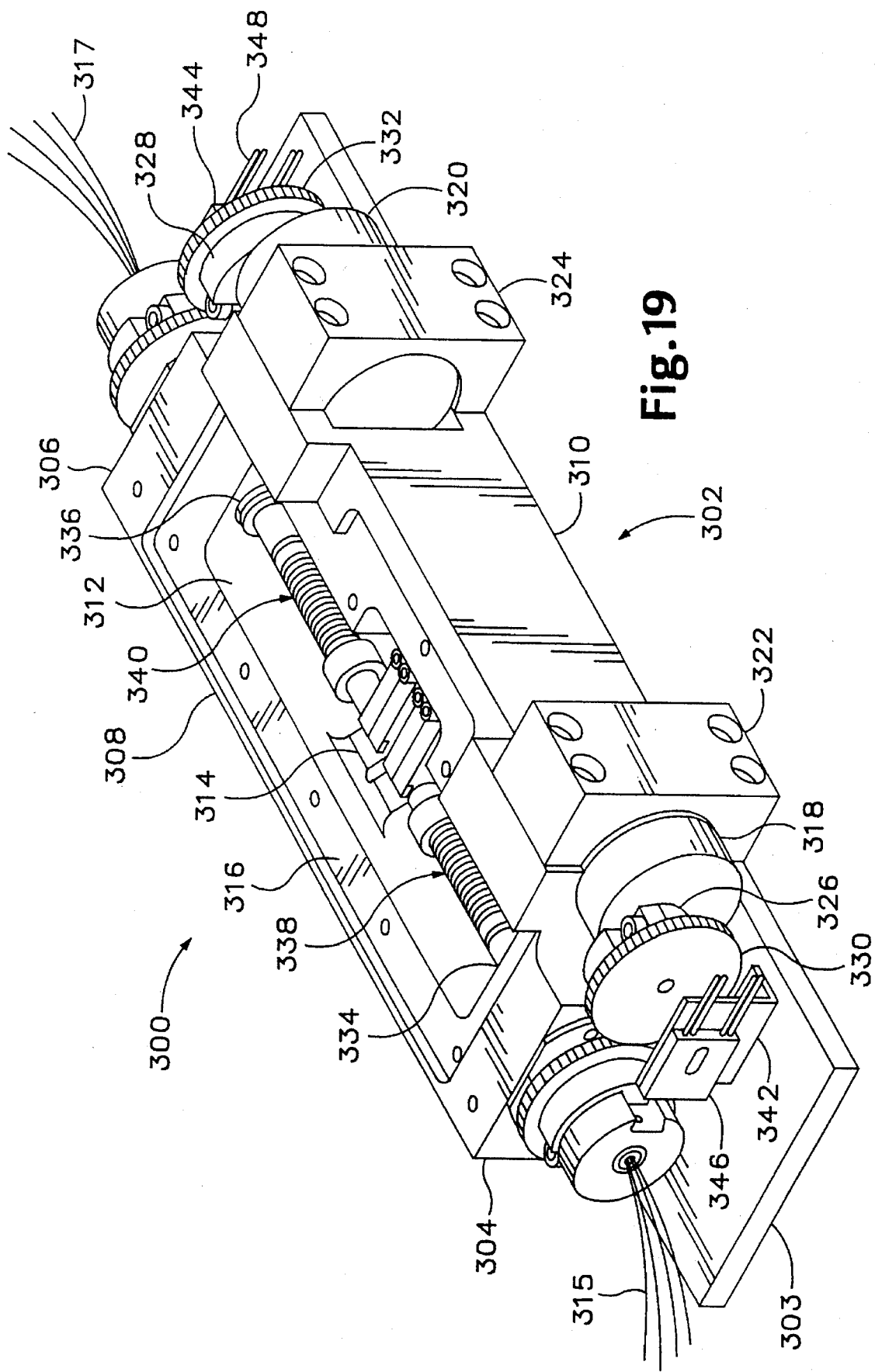
FIG. 19 is a perspective view of an improved mechanical optical switch according to the present invention.

Referring to FIG. 19, there is shown a perspective view of an improved mechanical fiber optical switch 300 according to the present invention. Switch 300 has a housing 302 having a base 303, end walls 304 and 306 and sidewalls 308 and 310 forming a cavity 312. Disposed within the cavity 312 is a central pedestal 314 of similar design to the pedestal 34 in FIG. 3. Holder assemblies having a similar design to the holder assemblies in FIGS. 7A and 7B are formed in the pedestal 314. The holder assemblies include offset V-grooves and spring clamps for holding the mounting members 350. A recess 316 is formed in the top of the housing 302 for receiving a gasket (not shown). The gasket is secured in the recess 316 by a top plate (not shown), which is similar to the top plate 40 in FIG. 3. Like the switch 20 in FIG. 3 a circuit board (not shown) containing electronic circuitry is mounted on the switch housing 302. The cavity 3 14 is enclosed by the top plate and may be filled with an appropriate index matching fluid to reduce back refections of the input light passing between the input fibers 315 and output fibers 317.

Drive motors 318 and 320, such as stepper motors or DC motors with encoders, are secured to the sidewall 310 by motor clamps 322 and 324. Gear clamps 326 and 328 secure toothed spur gears 330 and 332 to the drive motor 318 and 320 shafts. Bores 334 and 336 (bore 336 being visible) are formed in the respective end walls 304 and 306 for receiving mounting member drive line assemblies 338 and 340. Mounted on the base 303 are detector brackets 342 and 344 for mounting reflective sensors 346 and 348, such as manufactured and sold by Honeywell, Inc., Minneapolis, Minn., under part number HOA1160.

The housing 302, the top plate, motor clamps and detector brackets may be made of the same material as the housing 22 in FIG. 3. In the improved design these parts are milled or formed aluminum. The drive motors 318 and 320 are stepper motors manufactured and sold by HSI, Inc. Waterbury, Conn., under part number 33755-01. The gear clamps 326 and 328 used in the current design are manufactured and sold by W. M. Berg, Inc., East Rockaway, N.Y. under part number CG1-25-A. The toothed spur gears are manufactured and sold by PIC Precision Industrial Components Corp., Middlebury, Conn. under part number H47-72.

Figure 20:
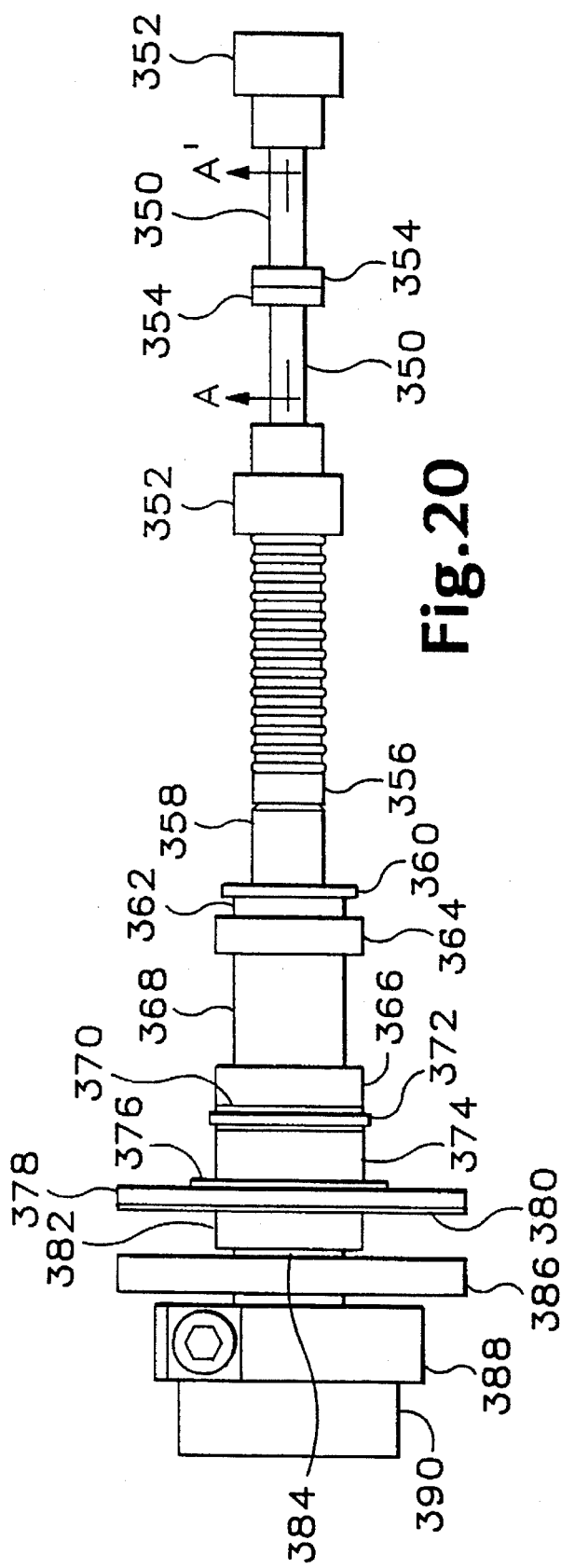
FIG. 20 is a plan view of the mounting member drive line assembly of the improved mechanical optical switch according to the present invention.

Referring to FIG. 20 there is shown a plan view of the opposing mounting members and one of the two similarly designed mounting member drive lines 338 and 340. The mounting member drive line has a mounting member 350, such as a ferrule or the like, having one end coupled to a strain relief coupling 352. The other end of the mounting member 350 has a sleeve member 354 secured thereto, the purpose of which will be described in greater detail below. Coupled to the other end of the strain relief coupling 352 is a flexible drive shaft coupling 356, such as a flexible bellows manufactured by Servometer Corp., Ceder Grove, N.J., under part number FC-1. For use in the mechanical fiber optic switch of this design, the stock couplings of the bellows have been replaced and the interior bore has been enlarged. One end of the flexible drive shaft coupling 356 fits into the end of the strain relief coupling 352 and the other end fits over a drive shaft 358. The drive shaft is a stainless steel part, such as manufactured by PIC Precision Industrial Components Corp., Middlebury, Conn. under part number A3-23 or by W. M. Berg, Inc., East Rockaway, N.Y., under part number S4-23. Mounted on the drive shaft 358 is a retaining ring 360, such as manufactured by W. M. Burg, Inc. under part number Q7-25. Mounted on the drive shaft 358 next to the retaining ring 360 is an inner race spacer, such as manufactured by W. M. Berg, Inc., under part number SS2-32. Bearings 364 and 366, such as manufactured by W. M. Berg, Inc. under part number B1-31-Q3, are mounted on the drive shaft 358 next to the spacer 362. Positioned between the bearings 364 and 366 is a bearing spacer 368, such as manufactured by W. M. Berg, Inc. under part number SS2-65. Positioned on the drive shaft 358 adjacent to the bearing 366 is an outer race spacer 370, such as manufactured by W. M. Berg, Inc. under part number SS3-13, which is followed by another retaining ring 372, such as manufactured by W. M. Berg, Inc. under part number Q4-50. A seal 374, such as manufactured by Bat Seal Engineering Co., Inc., Santa Ana, Calif. under part number R315LB-202-SP-45, is positioned adjacent to the retaining ring 372. The end of the seal 374 opposite the retaining ring 372 has a flange 376, which fits into a recess formed in the outer surface of the end walls 304 and 306 and surrounds the apertures 334 and 336. A seal cover 378 and an outer race spacer 380 are positioned against the seal 374. The seal cover and the outer race spacer 380 have co-extensive apertures formed therein for receiving screws or the like. The seal cover 378 and the outer race spacer 380 are secured to the outer surface of the end walls 304 and 306 with the screws for securing the seal 374 in the housing 302. Positioned on the drive shaft 358 adjacent to the outer race spacer 380 is a bearing 382, such as manufactured by W. M. Berg, Inc. under part number B1-31-Q3, and another inner race spacer 384, such as manufactured by W. M. Berg, Inc. under part number SS2-30. A toothed spur gear 386, similar to the gears 330 and 332, are mounted on the drive shaft 358 and secured thereto by gear clamp 388, similar to gear clamps 326 and 328. A reflector code wheel 390 is mounted on the end of the drive shaft 358 in line with one of the reflective sensors 346 or 348. The improved simplified drive line has fewer coupling joints compared to the drive line in FIGS. 4 and 5. Further, all couplings are either bonded with an epoxy, such as TRA-Bond BA-F230 epoxy or Epo-tek 353ND epoxy, or clamped in place with a split-hub restraining device.

Figure 21:
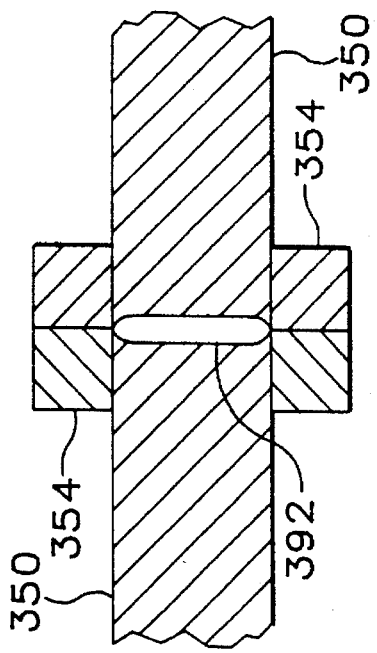
FIG. 21 is a cross-section view along line A–A' of the mounting member of the improved mechanical optical switch according to the present invention.

As previously described with regard to the mounting member ferrule 86, mounting member ferrule 350 may be formed of a borosilicate glass. Extensive testing of the mechanical fiber optic switch of the present invention has shown that the end-faces of the glass ferrules 350 were wearing against each other. This wear resulted in damaged fibers at the optical interface. Sometimes the fibers also became contaminated by wear particles. The problem exhibited itself as a gradual, but sometimes erratic, increase in switch insertion loss. The cross-sectional view of FIG. 21 along line A–A' of FIG. 20 shows how the use of ceramic sleeves 354 resolved this problem. The ceramic sleeves 354, such as manufactured and sold by Mindurm Precision Products, Rancho Cucamonga, Calif., are epoxied to the end faces of the glass ferrules 350. The ferrule, populated with optical fibers, and the sleeves 354 are polished as a monolithic part. Since the ceramic is much harder than the glass, it polishes more slowly. This results in an under-polish 392, with the surface of the glass roughly 11–15 microns below the surface of the ceramic. Consequently, the glass ferrules do not tough at all as representatively shown in FIG. 21. The ceramic sleeves keep the ferrules separated by about 25 microns. Additionally, Since the ceramic wears much better than the glass, there are fewer wear particles to cause problems with contamination. An alternative to using ceramic sleeves with glass ferrules, is to replace the glass ferrules with ceramic ferrules, such as manufactured and sold by Rikei of America, Cupentino, Calif. Less under polishing of the fibers will occur with the ceramic ferrules but this may be advantageous in slightly reducing the insertion loss due to less longitudinal misalignment. A preferred material for use in forming the ceramic sleeves 354 and the ceramic ferrules is zirconium oxide having a fracture toughness of 8 MPa*m0½.

Another problem discovered during the extensive testing of the mechanical fiber optic switch of the present invention was that the ferrules were differentially wearing into the V-grooves too fast, causing the switch to go out of alignment. This problem exhibited itself as a gradual increase in insertion loss, punctuated occasionally by sharp changes in the insertion loss. A solution to this problem is lining the V-grooves and the spring clamps with wear resistant ceramic inserts of zirconium oxide similar in composition to the ceramic sleeves 364 and ferrules 350. Sapphire inserts, used with the glass ferrules, may also be a solution to this problem.

A further problem was encountered in bonding the wear resistant quartz inserts in the V-grooves. Hard and rigid bonding agents, such as epoxies, cause the inserts to warp. To prevent the epoxies from warping the inserts, the thickness of the inserts were increased to 0.062 inches thick. This has greatly reduces the amount of warping.

A further embodiment of the mechanical optical switch 20 is to add a photodiode within the switch 20 proximate to the interface between the input and output fiber arrays 148 and 150. The photodiode monitors the amount of light scattered near the optical interface between the arrays 148 and 150 and generates an electrical output as a function of the misalignment of the various ports of the switch 20. A minimum electrical signal from the photodiode indicates the maximum alignment between the selected input and output ports. Including the photodiode in the mechanical optical switch 20 permits active alignment of the ports after it has been put in use. This can extend the useful life of the switch 20.

Figure 22:
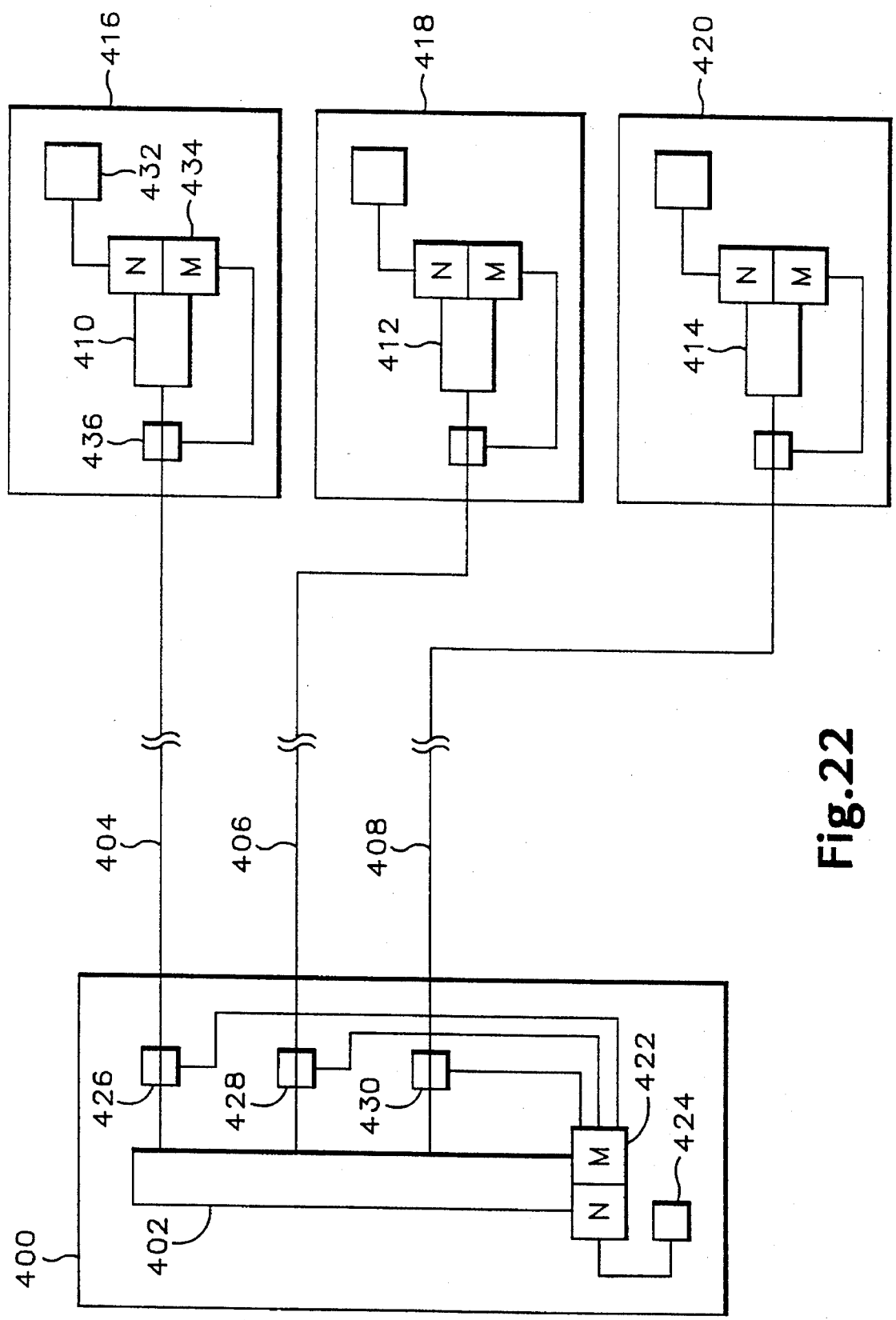
FIG. 22 is a simplified representation of a remote fiber test system using the mechanical optical switch according to the present invention.

Having aligned the ports of the switch 20, it is now usable in remote fiber test systems. It is envisioned that such systems are part of a central office system of a telecommunications company as is representatively shown in FIG. 22. The central office 400 has a central office switch 402 coupled to optical fiber links 404, 406, and 408, which are connected to other central office switches 410, 412, and 414 in remote central offices 416, 418, and 420. The optical fiber links 404, 406, and 408 consist of optical transmission fibers for carrying optical communications and an optical test fiber, also called a "dark fiber" in the industry. The optical switch 422 of the present invention is tied into the central office switch 402 as part of a remote fiber test system. The test system includes at one measurement test instrument 424, such as an optical time domain reflectometer (OTDR), an optical power meter, SDH/SONET test set, or the like coupled to the input port or fiber of the switch 422. The output fibers or ports of the switch 422 are coupled to the optical fiber links 404, 406, and 408 via optical couplers 426, 428, and 430. Couplers 426, 428, and 430 may be wavelength division multiplexers (WDM).

In one application, the WDMs 426, 428, and 430 are coupled to the "dark fibers" in the optical fiber links 404, 406, and 408 and the measurement test instrument 424 is an OTDR. A central office computer passes commands to the switch 20 over a bus for connecting a particular input port to a particular output port. The electronic circuitry on the switch 20 interprets the command and accesses the stored coordinate positions for the selected ports and rotates each port to the intersection point on the closed curves of the ports. Commands are sent to the optical switch 422 to align a particular output fiber or port with the input fiber or port coupled to the OTDR 424. For example, output port 1 of the switch 424 maybe coupled to the "dark fiber" of the optical fiber link 404 through WDM 426. The OTDR 424 launches optical pulses into the "dark fiber" and the return reflected optical backscatter signal is coupled to the OTDR 424 through the WDM 426 and the optical switch 422. The OTDR 424 processes the return optical signal and produces a display or table indicating the presence of anomalies in the fiber, such as reflections, losses, and the like. Additional commands can be sent to the optical switch 422 for aligning any of the other output fiber or ports to the input fiber or port for examining the other "dark fibers" in the other optical links. Further, additional pieces of measurement test equipment may be coupled to additional input fibers or ports of the optical switch 422.

The output fiber or ports of the optical switch can also be connected to the optical transmission fibers of the optical links via WDMs connected to these fibers. In examining active transmission fibers with an OTDR, the wavelength of the optical output of the OTDR 424 is different from the wavelength of the active optical transmissions over the transmission fibers. For example, if the transmission link is operating at 1310 nm wavelength, then the OTDR 424 operates at 1550 nm wavelength for examining the transmission fibers of the link. These tests can be performed while active transmissions are occurring in the fiber.

Another application for the remote fiber test system is performing SDH/SONET performance test using an SDH/SONET test set. Such a test set has a transmitting instrument at one end and a receiver instrument at the other end. As an example, the input fiber or port of the optical switch 422 is coupled to the SDH/SONET transmission instrument, as was the OTDR, at the central office 400. Central office 416 has the SDH/SONET receiver instrument 432 coupled to the input fiber or port of optical switch 434. The output port of the optical switch is connected to the optical link 404 via a WDM 436. Commands are sent to the optical switches 422 and 434 to align their input and output ports to couple the SDH/SONET transmission and receiver instruments together via one of the optical transmission fibers in the optical link 404. Each optical transmission fiber of the optical link can be coupled to one of the respective output fibers or ports of the optical switches vie WDMs to allow SDH/SONET testing of all of the transmission fibers in the link.

The mechanical optical switch 20 of the present invention has been described using electrical stepper motors 46 for rotating input and output ferrules 144 and 146 to align the optical fibers 152 in the input and output optical fiber arrays 148 and 150 representing the input and output optical ports of the switch. It is also possible to practice the present invention using manual means for aligning the input and output optical ports. In such a switch, the stepper motors 46 and the toothed spur gears 48 are replaced with reduction gear assemblies. The reduction gear assemblies engage the ferrules drive shaft spur gears 72 on the ferrule drive shafts 62. A knob is provided for manually rotating the gear assembly and hence the ferrules 144 and 146 in the switch 20. Detents can be provided with the gear assembly to indicate alignment locations of the input and output ports. Alternately, alignment may be achieved by monitoring the appropriate output port for a maximum optical signal.

A mechanical optical switch has been described that meets cycle-to-cycle repeatability, long-term repeatability, and absolute misalignment specifications. The switch is inexpensive and easy to manufacture. The switch has offset ferrules that rotate about independent axes with the ferrules being held independently in separate three-point kinematically correct mounts, such as V-blocks. The V-blocks are lined with a wear-resistant material, such as glass or ceramic and lubricated with an index matching fluid. Offsetting the ferrules and mounting them in kinematically correct mounts allows the fibers held within the ferrules to trace out closed curves with the closed curves of the fibers in the input ferrule intersecting the closed curves of the fibers in the output ferrules. The input ferrule and the output ferrule are fully filled with fibers with all the fibers being accessible as ports with the exception of the fibers centered on the axes of the ferrules. Additionally, the ceramic sleeves are used to reduce the insertion loss between the input and output fibers over time by reducing the wear at the optical interface. Further, the optical switch is useable in a remote fiber test system for performing test on optical fiber links using optical measurement test equipment. These and other aspects of the present invention are set forth in the appended claims.

What is claimed is:

1. In an optical switch having first and second optical transmission paths in opposing relationship forming an optical interface and rotating about respective first and second independent and offset rotational axes for positioning the respective transmission paths on first and second closed curves with the closed curves being laterally offset from each other for establishing intersecting points on the closed curves and means for storing angular coordinates representative of the position of the respective transmission paths at the intersecting points of the first and second closed curves and drive motors for selectively rotating the first and second optical transmissions paths relative to each other about their respective independent and offset rotational axes, a method for axially aligning the opposing optical transmission paths comprising the steps of:

(1) rotating the first optical transmission path on the first closed curve to one of the intersecting points in response to the angular coordinate representative of the position of the first optical transmission path at the intersecting point on the first closed curve; and (2) simultaneously rotating the second optical transmission path on the second closed curve to the intersecting point corresponding to the intersecting point in step (1) in response to the angular coordinate representative of the position of the second optical transmission path at the intersecting point on the second closed curve.

2. The method for axially aligning the opposing optical transmission paths as recited in claim 1 further comprising the step of selecting the intersecting point on the closed curves closest to the optical transmission paths prior to rotating the first and second optical transmission paths to the selected intersecting point.

3. The method for axially aligning the opposing optical transmission paths as recited in claim 2 further comprising the steps of:

(1) rotating the respective first and second optical transmission paths past the selected intersecting point by the same amount; and (2) counter-rotating the first and second optical transmission paths simultaneously and stopping the optical transmission paths at the same time at the intersecting point.

4. The method for axially aligning the opposing optical transmission paths as recited in claim 1 wherein the optical switch further includes respective first and second home position sensors respectively associated with the drive motors for indicating the respective home positions of the drive motors further comprising the steps of:

(1) generating respective interrupt signals for stopping the respective drive motors if the drive motors drive past the home position; and (2) generating a user error code.

5. The method for axially aligning the opposing optical transmission paths as recited in claim 1 wherein a plurality of optical transmission paths rotate about the second independent and offset rotational axis for positioning the plurality of optical transmission paths on closed curves for establishing intersecting points between the closed curves of the plurality of optical transmission paths and the closed curve of the first optical transmission path, the steps comprising of:

(1) selecting one of the plurality of optical transmission paths rotatable about the second independent and offset rotational axis for axial alignment with the first optical transmission path;

(2) rotating the first optical transmission path on the first closed curve to one of the intersecting points of the selected optical transmission path of the plurality optical transmission paths in response to the angular coordinate representative of the position of the first optical transmission path at the intersecting point on the first closed curve; and (3) rotating the selected optical transmission path of the plurality of optical transmission paths on the its closed curve to the intersecting point corresponding to the intersecting point in step (2) in response to the angular coordinate representative of the position of the selected optical transmission path at the intersecting point on its closed curve.

6. The method for axially aligning the opposing optical transmission paths as recited in claim 5 wherein the steps (2) and (3) are performed simultaneously.

7. The method for axially aligning the opposing optical transmission paths as recited in claim 5 further comprising the step of selecting the intersecting point on the closed curves closest to the first optical transmission path and the selected optical transmission path of the plurality of optical transmission paths prior to rotating the first optical transmission path and the selected optical transmission path of the plurality of optical transmission paths to the selected intersecting point.

8. The method for axially aligning the opposing optical transmission paths as recited in claim 7 further comprising the steps of:

(1) rotating the respective first optical transmission path and the selected optical transmission path of the plurality of optical transmission paths past the selected intersecting point by the same amount; and (2) counter-rotating the first optical transmission path and the selected optical transmission path of the plurality of optical transmission paths simultaneously and stopping the optical transmission paths at the same time at the intersecting point.

9. The method for axially aligning the opposing optical transmission paths as recited in claim 5 wherein the optical switch further includes respective first and second home position sensors respectively associated with the drive motors for indicating the respective home positions of the drive motors further comprising the steps of:

(1) generating respective interrupt signals for stopping the respective drive motors if the drive motors drive past the home position; and (2) generating a user error code.

10. The method for axially aligning the opposing optical transmission paths as recited in claim 5 further comprising the steps of:

(1) validating the selected optical transmission path of the plurality of optical transmission paths as being within selected limits; and (2) generating a user error code when the selected optical transmission path of the plurality of optical transmission paths is outside the selected limits.

11. The method for axially aligning the opposing optical transmission paths as recited in claim 5 further comprising the steps of:

(1) selecting another optical transmission path from the plurality of optical transmission paths;

(2) selecting the intersecting point on the closed curves closest to the first optical transmission path and the newly selected optical transmission path of the plurality of optical transmission paths;

(3) summing the angular coordinate of the selected intersecting point of the newly selected optical transmission path with the angular coordinate of the previous optical transmission path of the plurality of optical transmission paths;

(4) comparing the summed angular coordinates to a maximum range value; and (5) generating a user error code when the summed angular coordinates exceeds the maximum range value.

12. The method for axially aligning the opposing optical transmission paths as recited in claim 1 wherein a plurality of optical transmission paths rotate about the first independent and offset rotational axis for positioning the plurality of optical transmission paths on closed curves for establishing intersecting points between the closed curves of the plurality of optical transmission paths and the closed curve of the second optical transmission path, the steps comprising:

(1) selecting one of the plurality of optical transmission paths for axial alignment with the second optical transmission path;

(2) rotating the selected optical transmission path of the plurality of optical transmission paths on its closed curve to one of the intersecting points in response to the angular coordinate representative of the position of the selected optical transmission path at the intersecting point on its closed curve; and (3) rotating the second optical transmission path on the second closed curve to the intersecting points corresponding to the intersecting point in step (2) in response to the angular coordinate representative of the position of the second optical transmission path at the intersecting point on the second closed curve.

13. The method for axially aligning the opposing optical transmission paths as recited in claim 12 wherein the steps (2) and (3) are performed simultaneously.

14. The method for axially aligning the opposing optical transmission paths as recited in claim 12 further comprising the step of selecting the intersecting point on the closed curves closest to the second optical transmission path and the selected optical transmission path of the plurality of optical transmission paths prior to rotating the second optical transmission path and the selected optical transmission path of the plurality of optical transmission paths to the selected intersecting point.

15. The method for axially aligning the opposing optical transmission paths as recited in claim 14 further comprising the steps of:

(1) rotating the respective second optical transmission path and the selected optical transmission path of the plurality of optical transmission paths past the selected intersecting point by the same amount; and (2) counter-rotating the second optical transmission path and the selected optical transmission path of the plurality of optical transmission paths simultaneously and stopping the optical transmission paths at the same time at the intersecting point.

16. The method for axially aligning the opposing optical transmission paths as recited in claim 12 wherein the optical switch further includes respective first and second home position sensors respectively associated with the drive motors for indicating the respective home positions of the drive motors further comprising the steps of:

(1) generating respective interrupt signals for stopping the respective drive motors if the drive motors drive past the home position; and (2) generating a user error code.

17. The method for axially aligning the opposing optical transmission paths as recited in claim 12 further comprising the steps of:

(1) validating the selected optical transmission path of the plurality of optical transmission paths as being within selected limits; and (2) generating a user error code when the selected optical transmission path of the plurality of optical transmission paths is outside the selected limits.

18. The method for axially aligning the opposing optical transmission paths as recited in claim 12 further comprising the steps of:

(1) selecting another optical transmission path from the plurality of optical transmission paths;

(2) selecting the intersecting point on the closed curves closest to the second optical transmission path and the newly selected optical transmission path of the plurality of optical transmission paths;

(3) summing the angular coordinate of the selected intersecting point of the newly selected optical transmission path with the angular coordinate of the previous optical transmission path of the plurality of optical transmission paths;

(4) comparing the summed angular coordinates to a maximum range value; and (5) generating a user error code when the summed angular coordinates exceeds the maximum range value.

19. The method for axially aligning the opposing optical transmission paths as recited in claim 1 wherein a first plurality of optical transmission paths rotate about the first independent and offset rotational axis for positioning the first plurality of optical transmission paths on closed curves and a second plurality of optical transmission paths rotate about the second independent and offset rotational axis for positioning the second plurality of optical transmission paths on closed curves for establishing at least one intersecting point between each of the closed curves of the plurality of first and second optical transmission paths, the steps comprising of:

(1) selecting one of the plurality of optical transmission paths rotatable about the first independent and offset rotational axis for axial alignment with one of the plurality of optical transmission paths rotatable about the second independent and offset rotational axis;

(2) rotating the selected optical transmission path of the first plurality of optical transmission paths on its first closed curve to one of the intersecting points in response to the angular coordinate representative of the position of the selected optical transmission path at the intersecting point on its first closed curve; and (3) rotating the selected optical transmission path of the second plurality of optical transmission paths on its closed curve to the intersecting point corresponding to the intersecting point in step (2) in response to the angular coordinate representative of the position of the selected optical transmission path at the intersecting point on its closed curve.

20. The method for axially aligning the opposing optical transmission paths as recited in claim 19 wherein the steps (2) and (3) are performed simultaneously.

21. The method for axially aligning the opposing optical transmission paths as recited in claim 19 further comprising the step of selecting the intersecting point on the closed curves closest to the selected optical transmission path of the first plurality of optical transmission paths and the selected optical transmission path of the second plurality of optical transmission paths prior to rotating the respective optical transmission paths to the selected intersecting point.

22. The method for axially aligning the opposing optical transmission paths as recited in claim 21 further comprising the steps of:

(1) rotating the respectively selected optical transmission paths of the first and second plurality of optical transmission paths past the selected intersecting point by the same amount; and (2) counter-rotating the respective optical transmission paths simultaneously and stopping the optical transmission paths at the same time at the intersecting point.

23. The method for axially aligning the opposing optical transmission paths as recited in claim 19 wherein the optical switch further includes respective first and second home position sensors respectively associated with the drive motors for indicating the respective home positions of the drive motors further comprising the steps of:

(1) generating respective interrupt signals for stopping the respective drive motors if the drive motors drive past the home position; and (2) generating a user error code.

24. The method for axially aligning the opposing optical transmission paths as recited in claim 5 further comprising the steps of:

(1) validating each of the selected optical transmission paths of the plurality of first and second optical transmission paths as being within selected limits; and (2) generating a user error code when either of the selected optical transmission paths are outside the selected limits.

25. The method for axially aligning the opposing optical transmission paths as recited in claim 19 further comprising the steps of:

(1) selecting another optical transmission path from the second plurality of optical transmission paths;

(2) selecting the intersecting point on the closed curves closest to the optical transmission path of the first plurality of optical transmission paths and the newly selected optical transmission path of the second plurality of optical transmission paths;

(3) summing the angular coordinate of the selected intersecting point of the newly selected optical transmission path with the angular coordinate of the previous optical transmission path of the second plurality of optical transmission paths;

(4) comparing the summed angular coordinates to a maximum range value; and (5) generating a user error code when the summed angular coordinates exceeds the maximum range value.

26. The method for axially aligning the opposing optical transmission paths as recited in claim 19 further comprising the steps of:

(1) selecting another optical transmission path from the first plurality of optical transmission paths;

(2) selecting the intersecting point on the closed curves closest to the optical transmission path of the second plurality of optical transmission paths and the newly selected optical transmission path of the first plurality of optical transmission paths;

(3) summing the angular coordinate of the selected intersecting point of the newly selected optical transmission path with the angular coordinate of the previous optical transmission path of the first plurality of optical transmission paths;

(4) comparing the summed angular coordinates to a maximum range value; and (5) generating a user error code when the summed angular coordinates exceeds the maximum range value.

27. The method for axially aligning the opposing optical transmission paths as recited in claim 19 further comprising the steps of:

(1) selecting another optical transmission path from the first plurality of optical transmission paths and another optical transmission path from the second plurality of optical transmission paths;

(2) selecting the intersecting point on the closed curves closest to the newly selected optical transmission paths of the first and second plurality of optical transmission paths;

(3) summing the angular coordinate of the selected intersecting point of the newly selected optical transmission path with the angular coordinate of the previous optical transmission path of the first plurality of optical transmission paths;

(4) summing the angular coordinate of the selected intersecting point of the newly selected optical transmission path with the angular coordinate of the previous optical transmission path of the second plurality of optical transmission paths;

(5) comparing the summed angular coordinates of the respective selected optical transmission paths of the first and second plurality of optical transmission paths to a maximum range value; and (6) generating a user error code when the summed angular coordinates of either respective selected optical transmission paths exceeds the maximum range value.

* * * * *